US012634811B2

(12) United States Patent
Lee et al.

(10) Patent No.: US 12,634,811 B2
(45) Date of Patent: May 19, 2026

(54) ELECTRONIC DEVICE FOR SELECTING CELL, AND OPERATION METHOD THEREFOR

(71) Applicant: SAMSUNG ELECTRONICS CO., LTD., Suwon-si (KR)

(72) Inventors: Kyoungho Lee, Suwon-si (KR); Kipyo Nam, Suwon-si (KR); Sungsick Kim, Suwon-si (KR); Janggun Bae, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 301 days.

(21) Appl. No.: 18/244,019

(22) Filed: Sep. 8, 2023

(65) Prior Publication Data

US 2023/0422159 A1 Dec. 28, 2023

Related U.S. Application Data

(63) Continuation of application No. PCT/KR2022/002485, filed on Feb. 21, 2022.

(30) Foreign Application Priority Data

Mar. 9, 2021 (KR) ........................ 10-2021-0030713

(51) Int. Cl.
H04W 48/16 (2009.01)
H04W 48/18 (2009.01)
H04W 60/04 (2009.01)
(52) U.S. Cl.
CPC ........... *H04W 48/18* (2013.01); *H04W 48/16* (2013.01); *H04W 60/04* (2013.01)
(58) Field of Classification Search
CPC .................................................... H04W 48/18
(Continued)

(56) References Cited

U.S. PATENT DOCUMENTS

2012/0231793 A1 9/2012 Wu
2014/0198640 A1 7/2014 Suzuki et al.
(Continued)

FOREIGN PATENT DOCUMENTS

CN 112205029 A 1/2021
JP 2020171049 A 10/2020
(Continued)

OTHER PUBLICATIONS

3GPP; TSGCT; Non-Access-Stratum (NAS) protocol for 5G System (5GS); Stage 3; Dated Dec. 18, 2020.
(Continued)

*Primary Examiner* — Qutbuddin Ghulamali
(74) *Attorney, Agent, or Firm* — CANTOR COLBURN LLP

(57) ABSTRACT

According to various embodiments, an electronic device includes at least one processor. The at least one processor is configured to: after establishing an RRC connection with a first cell of a first RAT, confirm the occurrence of an event associated with the release of the RRC connection with the first cell; camp on to a second cell of a second RAT different from the first RAT in response to the confirmation of the occurrence of the event; initiate a timer, defined in an NAS, on the basis of a failure to register to a core network corresponding to the second RAT; and perform one of a scan associated with the first RAT or a scan associated with a RAT according to a preset priority, on the basis of the initiation of the timer, according to whether a service performed while connected to the first cell is an IMS call service.

16 Claims, 13 Drawing Sheets

(58) Field of Classification Search
  USPC ........................................................ 455/434
  See application file for complete search history.

(56)                    References Cited

U.S. PATENT DOCUMENTS

| 2015/0289114 | A1  | 10/2015 | Dandra et al. |
| 2016/0007257 | A1* | 1/2016  | Kim .................... H04W 36/144 |
|              |     |         | 370/331 |
| 2016/0066218 | A1* | 3/2016  | Basavarajappa ............................ |
|              |     |         | H04W 36/00224 |
|              |     |         | 370/331 |
| 2016/0127884 | A1* | 5/2016  | Kim ..................... H04W 60/04 |
|              |     |         | 455/435.2 |
| 2017/0142741 | A1* | 5/2017  | Kaur ................... H04W 72/121 |
| 2018/0115932 | A1* | 4/2018  | Gomes ................... H04W 4/08 |
| 2018/0310270 | A1* | 10/2018 | Islam ................... H04W 76/19 |
| 2018/0317194 | A1  | 11/2018 | Chen et al. |
| 2019/0059026 | A1* | 2/2019  | Huang-Fu ............. H04W 24/10 |
| 2019/0159099 | A1* | 5/2019  | Xu .................... H04W 36/0066 |
| 2020/0092720 | A1* | 3/2020  | Chin ..................... H04L 63/162 |
| 2020/0128420 | A1  | 4/2020  | Ryu |
| 2021/0051530 | A1* | 2/2021  | Venkataraman ...... H04W 76/12 |
| 2021/0076264 | A1* | 3/2021  | Zhang ............... H04W 36/0085 |
| 2023/0049004 | A1* | 2/2023  | Kuppelur .......... H04W 36/0079 |

FOREIGN PATENT DOCUMENTS

| KR | 20120087382 A  | 8/2012  |
| KR | 20150018644 A  | 2/2015  |
| KR | 20150128756 A  | 11/2015 |
| KR | 20150137051 A  | 12/2015 |
| KR | 20180057383 A  | 5/2018  |
| KR | 20180104578 A  | 9/2018  |
| KR | 20180123665 A  | 11/2018 |
| KR | 20190117684 A  | 10/2019 |
| WO | 2015009070 A1  | 1/2015  |
| WO | 2019053315 A1  | 3/2019  |

OTHER PUBLICATIONS

International Search Report and Written Opinion for International Application No. PCT/KR2022/002485; International Filing Date Feb. 21, 2022; Date of Mailing May 26, 2022; 11 Pages.
Extended European Search Report corresponding to Application No. 22767361.3-1215; Dated Sep. 10, 2024.

* cited by examiner

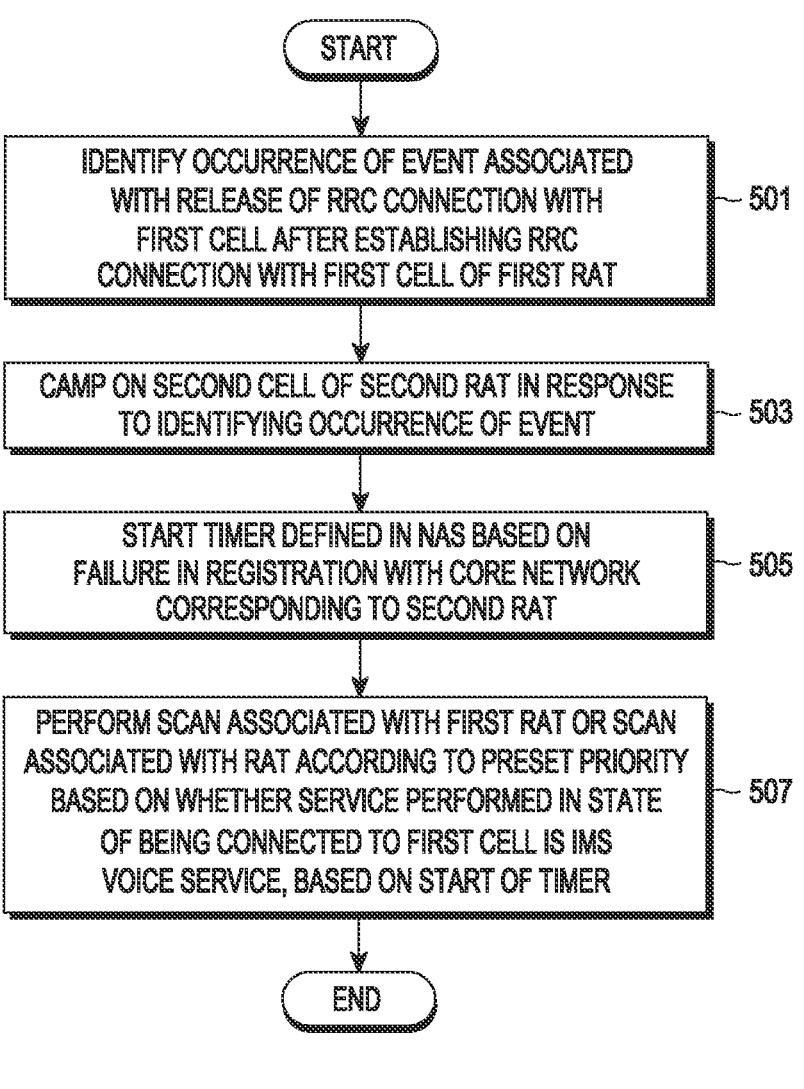

START

IDENTIFY OCCURRENCE OF EVENT ASSOCIATED
WITH RELEASE OF RRC CONNECTION WITH
FIRST CELL AFTER ESTABLISHING RRC
CONNECTION WITH FIRST CELL OF FIRST RAT ～501

CAMP ON SECOND CELL OF SECOND RAT IN RESPONSE
TO IDENTIFYING OCCURRENCE OF EVENT ～503

START TIMER DEFINED IN NAS BASED ON
FAILURE IN REGISTRATION WITH CORE NETWORK
CORRESPONDING TO SECOND RAT ～505

PERFORM SCAN ASSOCIATED WITH FIRST RAT OR SCAN
ASSOCIATED WITH RAT ACCORDING TO PRESET PRIORITY
BASED ON WHETHER SERVICE PERFORMED IN STATE
OF BEING CONNECTED TO FIRST CELL IS IMS
VOICE SERVICE, BASED ON START OF TIMER ～507

END

FIG. 5

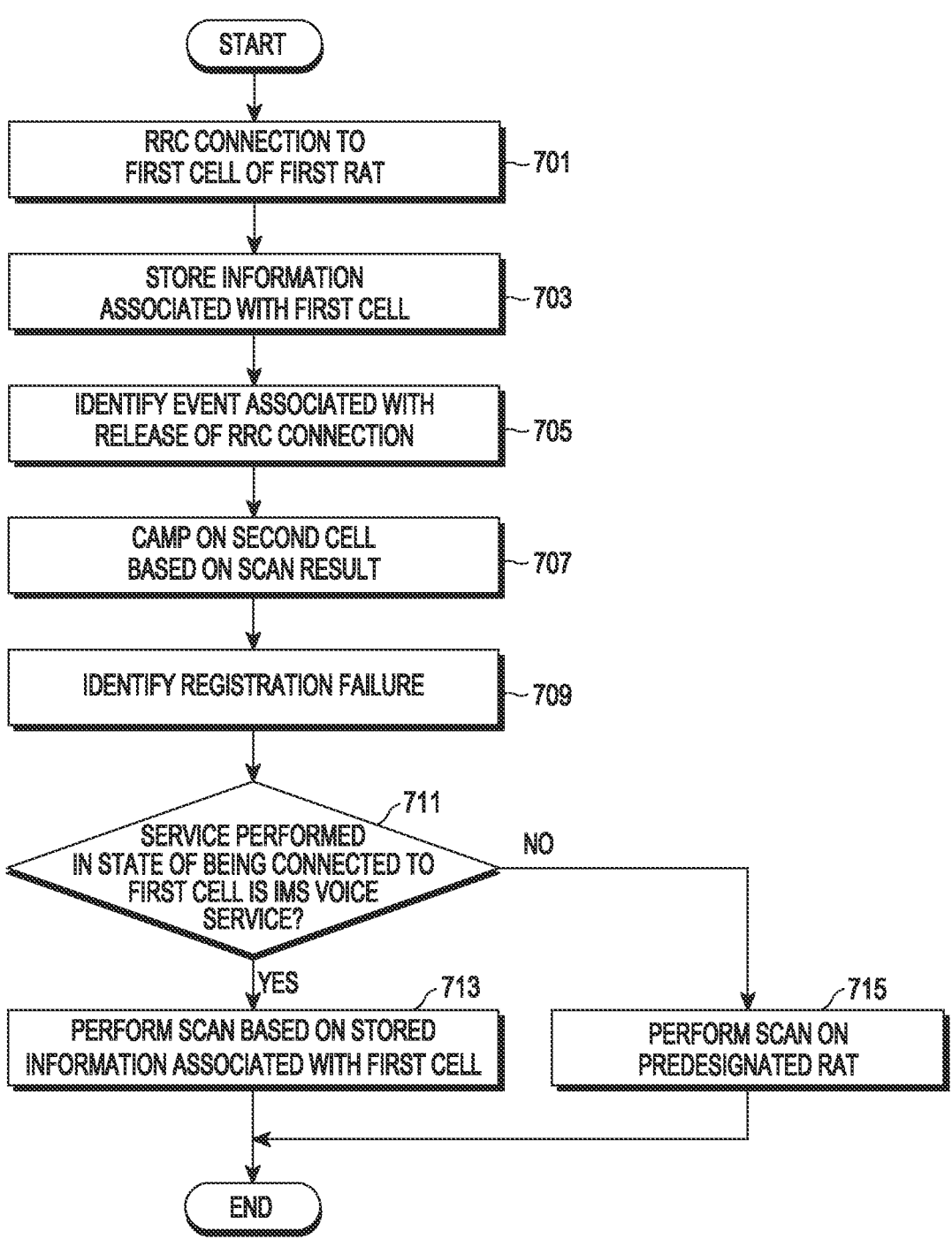

START

RRC CONNECTION TO
FIRST CELL OF FIRST RAT — 701

STORE INFORMATION
ASSOCIATED WITH FIRST CELL — 703

IDENTIFY EVENT ASSOCIATED WITH
RELEASE OF RRC CONNECTION — 705

CAMP ON SECOND CELL
BASED ON SCAN RESULT — 707

IDENTIFY REGISTRATION FAILURE — 709

SERVICE PERFORMED
IN STATE OF BEING CONNECTED TO
FIRST CELL IS IMS VOICE
SERVICE? — 711

NO

YES

PERFORM SCAN BASED ON STORED
INFORMATION ASSOCIATED WITH FIRST CELL — 713

PERFORM SCAN ON
PREDESIGNATED RAT — 715

END

FIG. 7

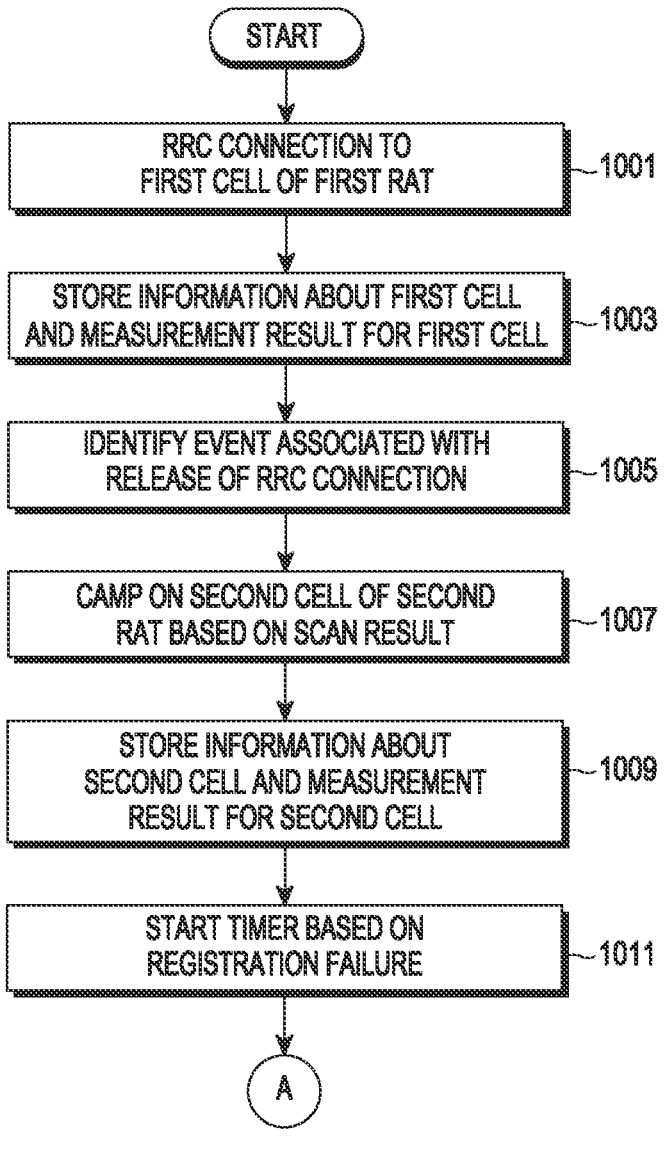

START

RRC CONNECTION TO
FIRST CELL OF FIRST RAT    ～1001

STORE INFORMATION ABOUT FIRST CELL
AND MEASUREMENT RESULT FOR FIRST CELL    ～1003

IDENTIFY EVENT ASSOCIATED WITH
RELEASE OF RRC CONNECTION    ～1005

CAMP ON SECOND CELL OF SECOND
RAT BASED ON SCAN RESULT    ～1007

STORE INFORMATION ABOUT
SECOND CELL AND MEASUREMENT
RESULT FOR SECOND CELL    ～1009

START TIMER BASED ON
REGISTRATION FAILURE    ～1011

ELECTRONIC DEVICE FOR SELECTING CELL, AND OPERATION METHOD THEREFOR

CROSS-REFERENCE TO RELATED APPLICATIONS

This application is a continuation application under, 35 U.S.C. § 111(a), of International Patent Application No. PCT/KR2022/002485, filed on Feb. 21, 2022, which claims priority to Korean Patent Application No. 10-2021-0030713, filed on Mar. 9, 2021, the content of which in their entirety is herein incorporated by reference.

BACKGROUND

1. Field

Various embodiments relate to an electronic device for selecting a cell and a method for operating the same.

2. Description of Related Art

A non-access stratum (NAS) layer may be a layer for transmitting and receiving signaling or traffic messages between a user equipment (UE) and a core network. For example, the user device may transmit a NAS message for registration to the core network or a NAS message for tracking area update (TAU). In the NAS layer, various timers are defined, and a start event, a stop event, and an event on end may be defined for each timer.

For example, when the UE is registered with a $5^{th}$ generation core (5GC), the UE may transmit a registration request message, which is a NAS message, to the 5GC (e.g., access & mobility management function (AMF)). According to the transmission of the registration request message, the T3510 timer defined in $3^{rd}$ generation partnership project (3GPP) technical specification (TS) 24.501 may start. The UE may stop the T3510 timer based on reception of a registration accept message or a registration reject message corresponding to the registration request message. Before the T3510 timer expires, the UE may wait for a registration accept message. Further, the T3511 timer is disclosed in 3GPP TS 24.501. The T3511 timer may start based on registration failure due to lower layer failure or expiration of the T3510 timer. Based on the expiration of the T3511 timer, the UE may transmit the registration request message again if it is still required to send a registration request message. Further, there are timers defined in various communications, such as LTE, WCDMA, and GSM, as well as the timers defined in the NAS layer of 5G.

SUMMARY

An electronic device and a method for operating the same according to various embodiments may perform a scan as the timer defined in the NAS layer starts, camp on to the cell of a radio access technology (RAT) with a good electric field based on the scan result, and perform registration to the corresponding core network.

According to various embodiments, an electronic device includes at least one processor. The at least one processor is configured to, after establishing a radio resource control (RRC) connection with a first cell of a first RAT, identify an occurrence of an event associated with release of the RRC connection with the first cell, in response to identifying the occurrence of the event, perform a camp on to a second cell of a second RAT different from the first RAT, start a timer defined in a NAS based on a failure in registration to a core network corresponding to the second RAT, and perform, based on starting the timer, any one of a scan associated with the first RAT or a scan associated with a RAT according to a preset priority, based on whether a service performed in a state of being connected to the first cell is an international mobile subscriber (IMS) call service.

According to various embodiments, a method for operating an electronic device includes after establishing an RRC connection with a first cell of a first RAT, identifying an occurrence of an event associated with release of the RRC connection with the first cell, in response to identifying the occurrence of the event, performing a camp on to a second cell of a second RAT different from the first RAT, starting a timer defined in a NAS based on a failure in registration to a core network corresponding to the second RAT, and performing, based on starting the timer, any one of a scan associated with the first RAT or a scan associated with a RAT according to a preset priority, based on whether a service performed in a state of being connected to the first cell is an IMS call service.

According to various embodiments, an electronic device includes at least one processor. The at least one processor is configured to, after establishing an RRC connection with a first cell of a first RAT, identify an occurrence of an event associated with release of the RRC connection with the first cell, in response to identifying the occurrence of the event, perform a camp on to the first cell of the first RAT or a second cell of the first RAT, start a timer defined in a NAS based on a failure in registration to a core network corresponding to the first RAT, and perform, based on starting the timer any one of a scan associated with the first RAT or a scan associated with a RAT according to a preset priority, based on whether a service performed in a state of being connected to the first cell is an IMS call service.

According to various embodiments, there may be provided an electronic device and a method for operating the same which may perform a scan as the timer defined in the NAS layer starts, camp on to the cell of a RAT with a good electric field based on the scan result, and perform registration to the corresponding core network. Accordingly, when a problem occurs in a specific RAT, registration to the core network may be quickly performed using a RAT with a good electric field without waiting for a registration attempt for the expiration time of the timer defined by the NAS layer, shortening the service disconnection.

BRIEF DESCRIPTION OF DRAWINGS

The above and other exemplary embodiments, advantages and features of this disclosure will become more apparent by describing in further detail exemplary embodiments thereof with reference to the accompanying drawings, in which:

FIG. 5 is a flowchart illustrating a method of operating an electronic device according to various embodiments;

FIG. 7 is a flowchart illustrating a method for operating an electronic device according to various embodiments;

FIGS. 10A and 10B are flowcharts illustrating a method for operating an electronic device according to various embodiments.

DETAILED DESCRIPTION

Figure 1:
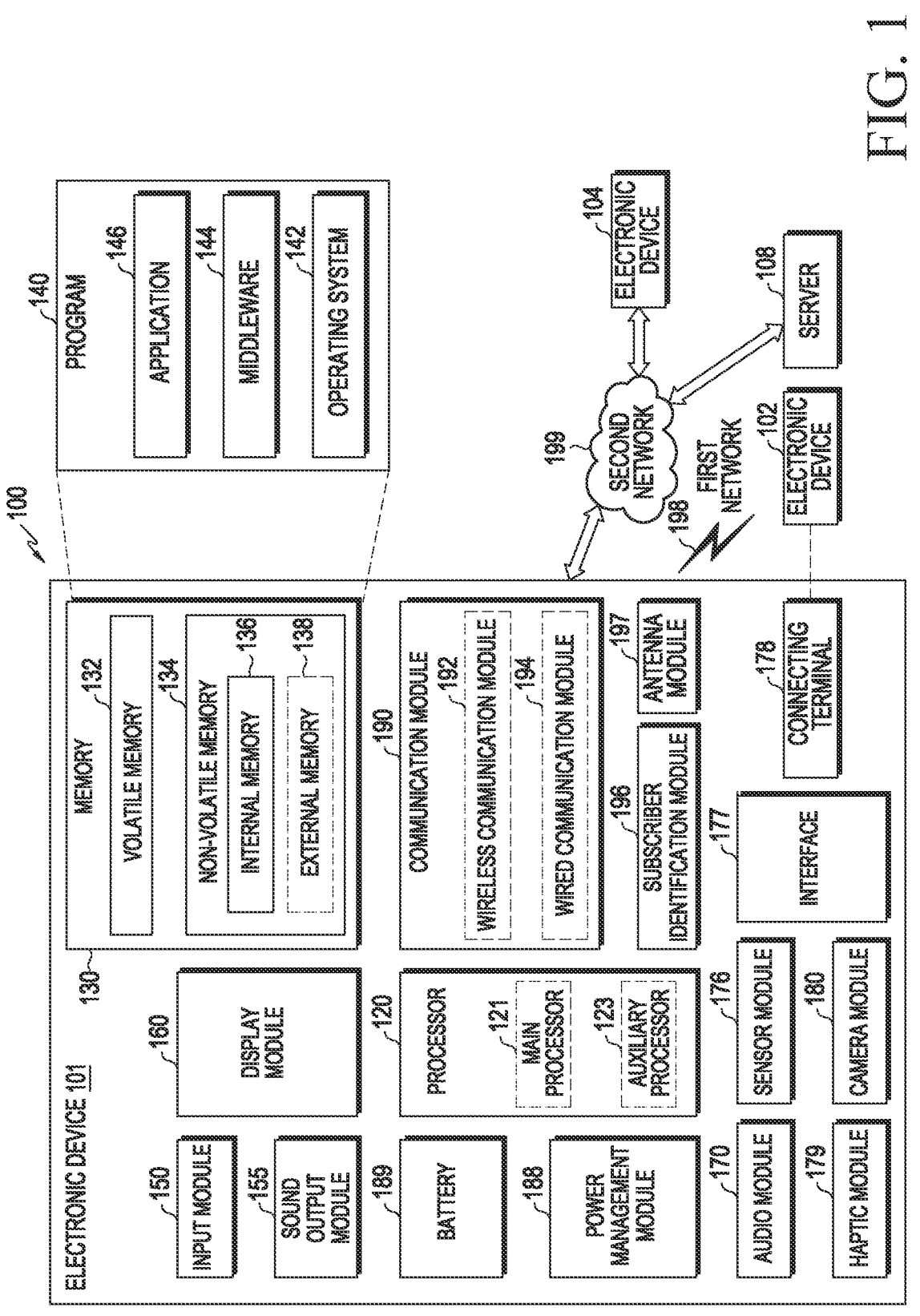
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor

121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a communication module 192 (e.g., a cellular communication module, a short-range communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The communication module 192 may identify or authenticate the electronic device 101 in a communication network, such as the first network 198 or the second network 199, using subscriber information (e.g., international mobile subscriber identity (IMSI)) stored in the subscriber identification module 196.

The communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The communication module 192 may support a high-frequency band (e.g., the mmWave band) to achieve, e.g., a high data transmission rate. The communication module 192 may support various technologies for securing performance on a high-frequency band, such as, e.g., beamforming, massive multiple-input and multiple-output (massive MIMO), full dimensional MIMO (PD-MIMO), array antenna, analog beam-forming, or large scale antenna. The communication module 192 may support various requirements specified in the electronic device 101, an external electronic device (e.g., the electronic device 104), or a network system (e.g., the second network 199). According to an embodiment, the communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
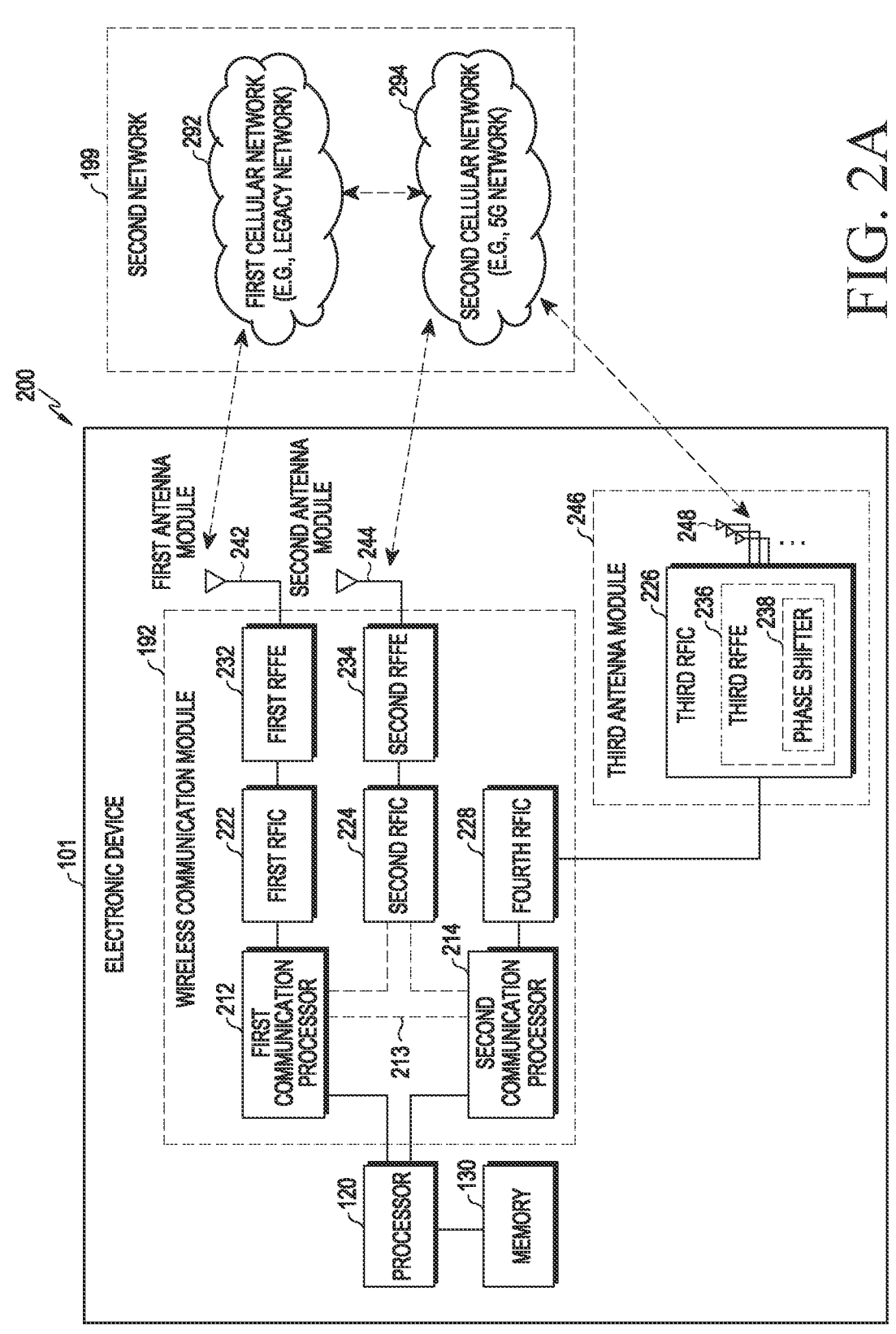
FIGS. 2A and 2B are block diagrams illustrating an electronic device for supporting legacy network communication and 5G network communication according to various embodiments.

FIG. 2A is a block diagram 200 illustrating an electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various types of information, such as sensing information, information about output strength, and resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package.

Figure 2B:
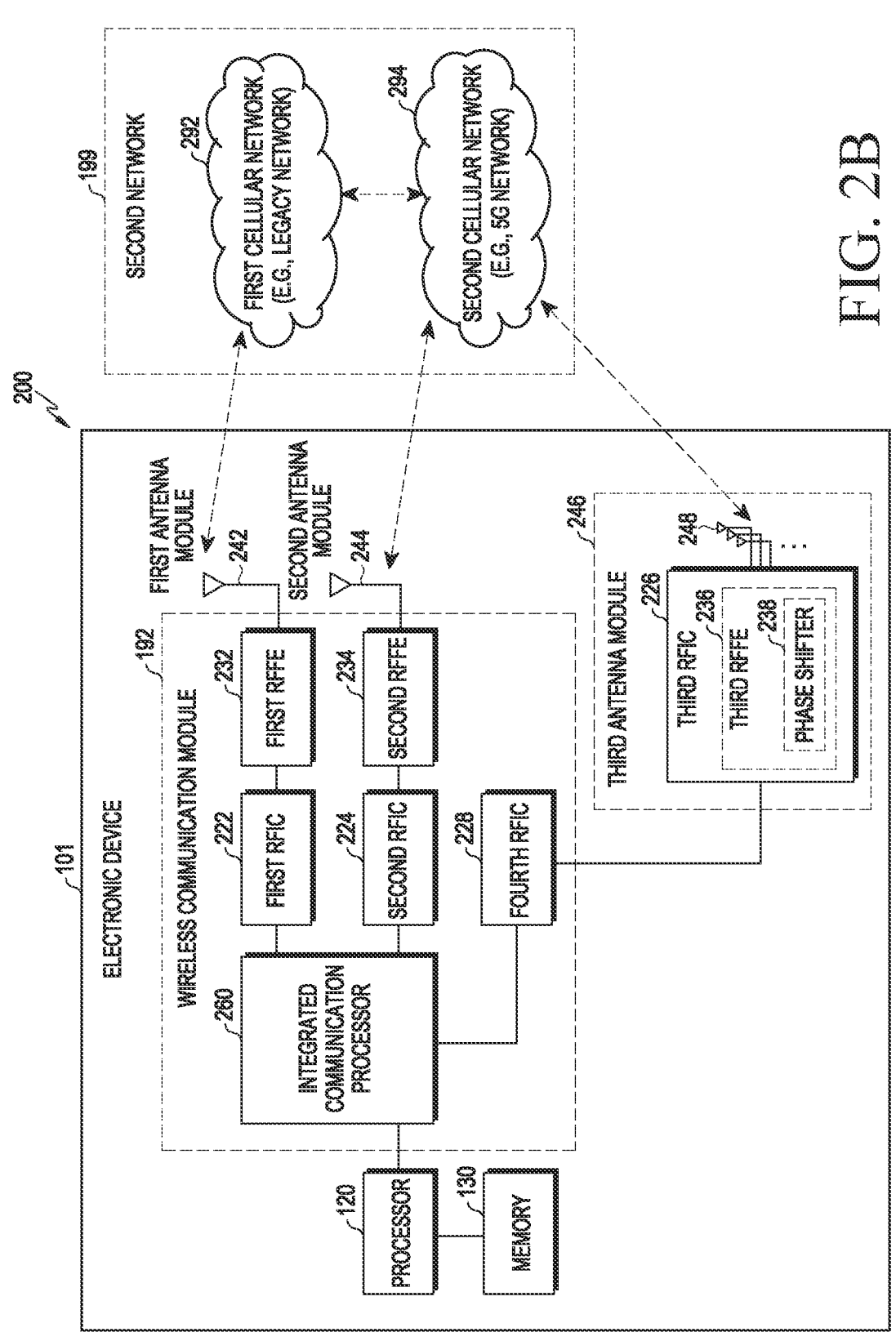

According to an embodiment, the first CP 212 or the second CP 214, along with the processor 120, an auxiliary processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE, 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may have the access network (e.g., 5G radio access network (RAN) or next generation RAN (NG RAN)) but may not have the core network (e.g., next generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

When an electronic device moves, handover or cell reselection may be performed depending on the network environment, and when it camps (e.g., connects for short-term period) on a new radio access technology (RAT) cell, the NAS layer may attempt registration to the core network. However, the registration attempt may fail due to a poor electric field in the new RAT or cause made by the network. If the registration attempt fails, the timer defined in the NAS layer described above may start, and the electronic device may wait for the registration attempt until the timer expires. For example, the expiration time of the T3510 timer defined in 3GPP TS 24.501 is 15 seconds, and the expiration time of the T3511 timer is 10 seconds. There is a possibility that the electronic device waits for a registration attempt for 25 seconds, which is the sum of the expiration times of both the timers. Even if the electric field of the RAT different from the RAT used in the registration attempt is good, there is a possibility that the service may be delayed as the electronic device waits for the expiration of the timer defined in the NAS layer.

Figure 3:
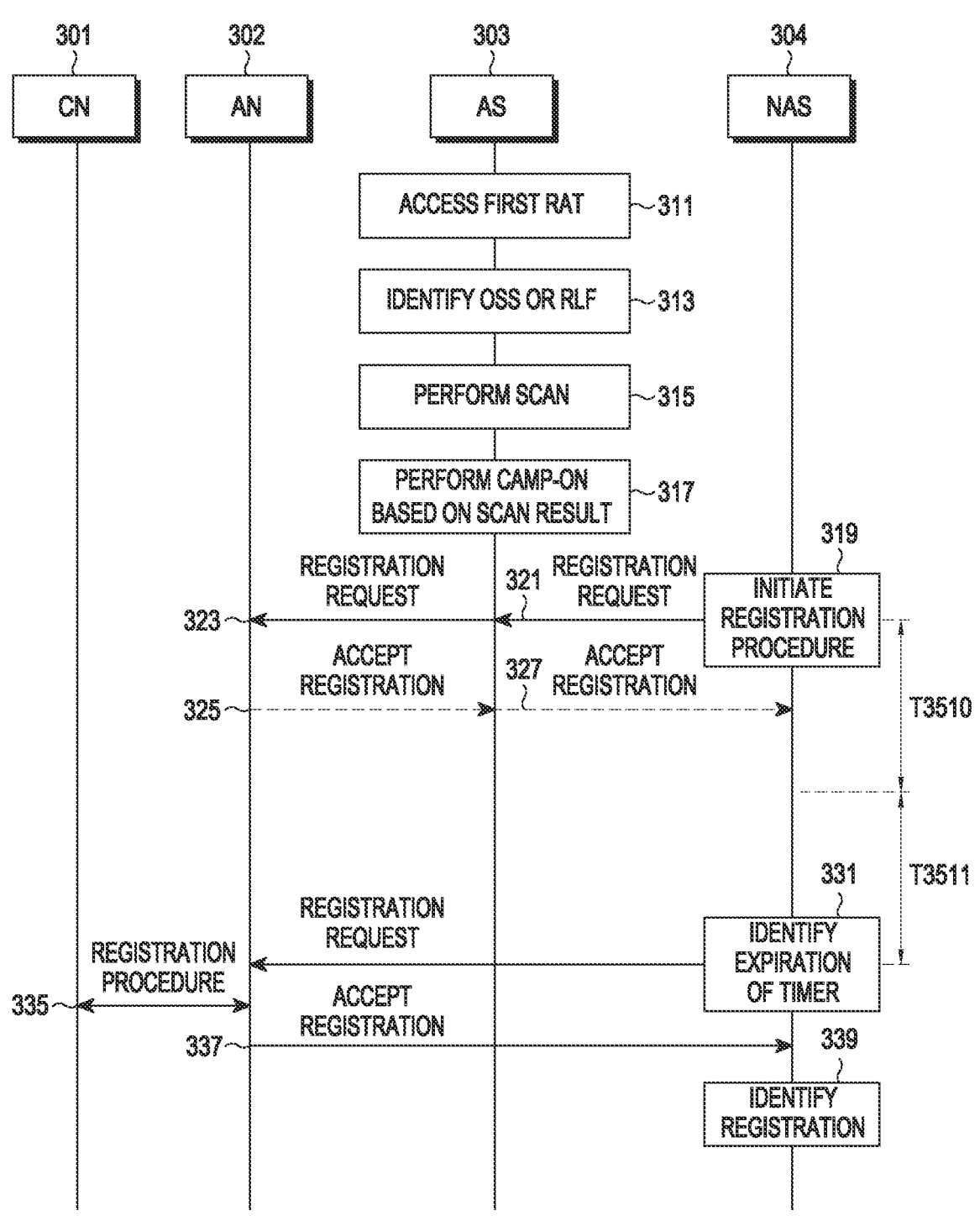
FIG. 3 is a flowchart illustrating a method of operation of an electronic device according to a comparative example for comparison with various embodiments.

FIG. 3 is a flowchart illustrating a method of operation of an electronic device according to a comparative example for comparison with various embodiments. At least some of the operations of the electronic device 101 according to the comparative example may also be performed by the electronic device 101 (e.g., at least one of the processor 120 of FIG. 1, the first communication processor 212 of FIG. 2A, the second communication processor 214 of FIG. 2A, or the integrated communication processor 260 of FIG. 2B) according to various embodiments.

The electronic device 101 according to the comparative example may perform at least one operation corresponding to each of the access stratum (AS) layer 303 and the NAS layer 304. In FIG. 3, operations performed in the AS layer 303 are illustrated as being performed by the AS layer 303, and operations performed in the NAS layer 304 are illustrated as being performed by the NAS layer 304, but the operations may be understood as being performed by the electronic device 101 (e.g., at least one of the processor 120 of FIG. 1, the first communication processor 212 of FIG. 2A, the second communication processor 214 of FIG. 2A, or the integrated communication processor 260 of FIG. 2B). Hereinafter, for convenience of description, it is expressed that the AS layer 303 performs a specific operation, and it is expressed that the NAS layer 304 performs a specific operation, but this may mean that the operations are performed by the electronic device 101 as described above.

In operation 311, the AS layer 303 may access the first RAT. Here, that the first RAT accesses the AS layer 303 may mean camping on the cell of the first RAT and/or completing the RACH procedure, but is not limited thereto. For example, it may access a cell (not shown) of the first RAT different from the cell of the access network (AN) 302. The procedure for accessing the AS layer 303 is not limited. In operation 313, the AS layer 303 may identify an out of service (OOS) or a radio link failure (RLF) in operation 313. For example, when the user carrying the electronic device 101 passes through a tunnel or when boarding an elevator, the AS layer 303 may identify the OOS or the RLF.

In operation 315, the AS layer 303 may perform a scan. Here, the scan of the AS layer 303 may include, e.g., measurement and/or evaluation of the signal (e.g., a synchronization signal and/or a reference signal) from the cell at the frequency of the target to be scanned, and may be referred to as a cell search. In operation 317, the AS layer 303 may camp on to the cell selected based on the scan result. For example, the AS layer 303 may determine whether a cell selection criterion is met. For example, when the cell selection criteria that Srxlev is greater than and Squal is greater than 0 are met, the electronic device 101 may identify that at least some of cell selection criteria are met. Here, Srxlev may be $Q_{rxlevmeas}-(Q_{rxlevmin}+Q_{rxlevminoffset})-P_{compensation}-Qoffset_{temp}$, and Squal may be $Q_{qualmeas}-(Q_{qualmm}+Q_{qualminoffset})-Qoffset_{temp}$. A description of each parameter is shown in Table 1.

TABLE 1

| | Definitions |
|---|---|
| Srxlev | Cell selection RX level value (dB) |
| Squal | Cell selection quality value (dB) |
| $Qoffset_{temp}$ | Offset temporarily applied to a cell as specified in TS (technical specification) 38.331 (dB) |
| Qrxlevmeas | Measured cell RX level value (RSRP) |
| Qqualmeas | Measured cell quality value (RSRQ) |
| Qrxlevmin | Minimum required RX level in the cell (dBm). If the UE supports SUL frequency for this cell, Qrxlevmin is obtained from RxLevMinSUL, if present, in SIB1, SIB2 and SIB4, additionally, if QrxlevminoffsetcellSUL is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1 SIB1, SIB2 and SIB4, additionally, if Qrxlevminoffsetcell is present in SIB3 and SIB4 for the concerned cell, this cell specific offset is added to the corresponding Qrxlevmin to achieve the required minimum RX level in the concerned cell. |
| Qqualmin | Minimum required quality level in the cell (dB). Additionally, if Qqualminoffsetcell is signaled for the concerned cell, this cell specific offset is added to achieve the required minimum quality level in the concerned cell. |
| Qrxlevminoffset | Offset to the signaled Qrxlevmin taken into account in the Srxlev evaluation as a result of a periodic search for a higher priority PLMN while camped normally in a VPLMN 3GPP TS 23.122 |
| Qqualminoffset | Offset to the signalled Qqualmin taken into account in the Squal evaluation as a result of a periodic search for a higher priority PLMN while camped normally in a VPLMN 3GPP TS 23.122 |

TABLE 1-continued

| | Definitions |
|---|---|
| Pcompensation | If the UE supports the additionalPmax in the NS-PmaxList, if present, in SIB1, SIB2 and SIB4: max(PEMAX1 − PPowerClass, 0) − (min(PEMAX2, PPowerClass) − min(PEMAX1, PPowerClass)) (dB); else: max(PEMAX1 − PPowerClass, 0) (dB) |
| PEMAX1, PEMAX2 | Maximum TX power level of a UE may use when transmitting on the uplink in the cell (dBm) defined as PEMAX in TS 38.101 [15]. PEMAX1 and PEMAX2 are obtained from the p-Max and NS-PmaxList respectively in SIB1, SIB2 and SIB4 as specified in TS 38.331 |
| PPowerClass | Maximum RF output power of the UE (dBm) according to the UE power class as defined in TS 38.101 |

Table 1 is based on 3GPP TS 38.304, and it will be understood by one of ordinary skill in the art that, for E-UTRA, the definition may be replaced with the definition set forth in 3GPP TS 36.304, and cell selection conditions of the electronic device 101 according to various examples are not limited according to the type of RAT. The electronic device 101 may determine whether the corresponding cell is a non-barred cell, as at least some of the cell selection conditions. The electronic device 101 may select and camp on, e.g., a suitable cell.

In operation 319, the NAS layer 304 may initiate a registration procedure. In operation 321, the NAS layer 304 may request the AS layer 303 to register. For example, the NAS layer 304 may request the AS layer 303 to transmit a NAS message (e.g., a registration request message). If the electronic device 101 attempts to register in the core network (CN) 301 of the the NAS layer 304 may start the T3510 timer based on transmission of the registration request message (e.g., registration request message). The T3510 timer and the T3511 timer may have information as shown in Table 2.

timer, T3210 timer, T3210 timer, T3211 timer, T3310 timer or T3311 timer defined in various communications.

In operation 323, the AS layer 303 may attempt to transmit the NAS message of the registration request to the core network 301 through the AN 302. If the core network 301 approves the registration based on the reception of the registration request, the core network 301 may transmit the NAS message of accepting registration (e.g., registration accept message) to the electronic device 101 through the AN 302. However, in the comparative example, the transfer of the registration acceptance in operation 325 may fail due to an error (e.g., a weak electric field) in the AN 302. Accordingly, the transfer of the registration acceptance from the AS layer 303 to the NAS layer 304 in operation 327 may also fail. Meanwhile, when the T3510 timer expires after the T3510 timer is started based on the transmission of the registration request message, the T3511 timer may be started as described in Table 2. In operation 331, the NAS layer 304 may identify expiration of the timer (e.g., the T3511 timer). If the T3511 timer expires, the NAS layer 304 may retrans-

TABLE 2

| | | | | Timer Information | | |
|---|---|---|---|---|---|---|
| number | expiration time | state | | cause of start | general interruption | operation on expiration |
| T3510 | 15 s | 5GMM-REGISTERED-INITIATED | | Transmission of REGISTARTION REQEUST message | REGISTRATION ACCEPT message received or REGISTRATION REJECT message received | Start T3511 or T3502 as specified in subclause 5.5.1.2.7 if T3510 expired during registration procedure for initial registration. Start T3511 or T3502 as specified in subclause 5.5.1.3.6 if T3510 expired during the registration procedure for mobility and periodic registration update |
| T3511 | 10 s | 5GMMDEREGISTERED.ATTEMPTINGREGIS-TRATION5GMMREGIS-TERED.ATTEMPTINGREGIS-TRATIONUPDATE | | At registration failure due to lower layer failure, T3510 timeout or registration rejected with other 5GMM cause values than those treated in subclause 5.5.1.2.5 for initial registration or subclause 5.5.1.3.5 for mobility and periodic registration | Transmission of REGISTRATION REQUEST message | Retransmission of the REGISTRATION REQUEST, if still required |

Meanwhile, in Table 2, the timers defined in the NAS of 5G are described as being started, but this is exemplary. Those skilled in the art will understand that the electronic device 101 may start at least one of the T3410 timer, T3411 mit the registration request in operation 333 according to Table 2. In operation 335, the AN 302 may perform a registration procedure with the core network 301. In operation 337, the AN 302 may transfer registration acceptance to the NAS layer 304 through the AS layer 303. In operation 339, the NAS layer 304 may identify registration.

For example, the electronic device 101 may transmit an RRC request message as many times as N300 through the RRC layer to attempt registration. If the T300 timer expires as the RACH fails or reception of the RRC setup message fails, the electronic device 101 may transmit the RRC request message again. If the number of transmissions of the RRC request message according to the expiration of the T300 timer reaches N300, a timer (e.g., the T3511 timer) defined in the NAS layer 304 may be started. Alternatively, when an RRC release message is received after registration due to an abnormal operation of the network, the timer defined in the NAS layer 304 may be started.

Meanwhile, in the comparative example of FIG. 3, the reattempt of the registration request transmission may be waited for the sum (e.g., 25s) of the expiration time of the T3510 timer and the expiration time of the T3511 timer. Accordingly, even if the electric field of the RAT different from the AN 302 is good, the electronic device 101 should wait for the expiration of the timer defined in the NAS layer 304 associated with the RAT of the AN 302.

Figure 4:
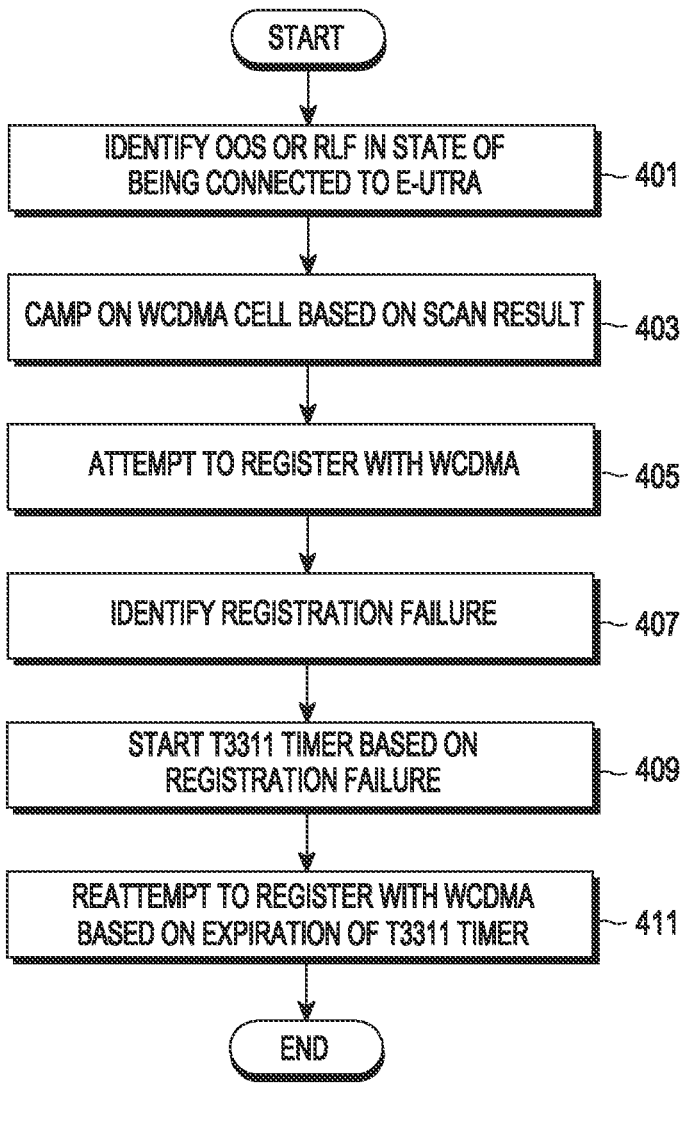
FIG. 4 is a flowchart illustrating an operation method of an electronic device according to a comparative example for comparison with various embodiments.

FIG. 4 is a flowchart illustrating an operation method of an electronic device according to a comparative example for comparison with various embodiments. At least some of the operations of the electronic device 101 according to the comparative example may also be performed by the electronic device 101 (e.g., at least one of the processor 120 of FIG. 1, the first communication processor 212 of FIG. 2A, the second communication processor 214 of FIG. 2A, or the integrated communication processor 260 of FIG. 2B) according to various embodiments.

In operation 401, the electronic device 101 according to the comparative example may identify OOS or RLF while being connected to the E-UTRA. For example, the electronic device 101 may identify the OOS or the RLF after camping on and/or establishing an RRC connection to the cell of the E-UTRA. According to the OOS or RLF, the electronic device 101 may scan the frequency. In operation 403, the electronic device 101 may camp on to the cell of the WCDMA based on the scan result. In operation 405, the electronic device 101 may attempt to register with the core network of the WCDMA. In operation 407, the electronic device 101 may identify a registration failure. In operation 409, the electronic device 101 may start the T3311 timer based on the registration failure. For example, the T3311 timer may be started after the RACH failure occurs five times in the RAT of the WCDMA. The expiration time of the T3311 timer may be, e.g., 15 seconds, and the cause for start thereof may be a lower layer failure. Accordingly, the T3311 timer having an expiration time of 15 seconds when the RACH fails may be started. In operation 409, the electronic device 101 may reattempt to register with the WCDMA based on the expiration of the T3311 timer. Until the T3311 timer expires, the electronic device 101 according to the comparative example does not perform a scan operation. Accordingly, when the telephone service is performed, the interruption time of the telephone service may increase.

FIG. 5 is a flowchart illustrating a method of operating an electronic device according to various embodiments.

According to various embodiments, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify the occurrence of an event associated with the release of the RRC connection with the first cell after establishing the RRC connection with the first cell of the first RAT in operation 501. Here, the event may mean, e.g., OOS or RLF, but it will be understood by one of ordinary skill in the art that there is no limitation as long as the RRC connection is released. In operation 503, the electronic device 101 may perform a camp on to the second cell of the second RAT in response to identifying the occurrence of the event. For example, the electronic device 101 may identify the OOS or the RLF in the state of being connected to the first cell of the first RAT, and may perform a scan accordingly. In one example, it is assumed that the electronic device 101 performs a scan at at least one frequency of the second RAT. The electronic device 101 may identify that the second cell is a suitable cell based on the scan result for the frequency of the second RAT. The electronic device 101 may camp on to the second cell.

According to various embodiments, in operation 505, the electronic device 101 may start the timer defined in the NAS layer, based on a failure to register with the core network corresponding to the second RAT. In one example, the electronic device 101 may start the T3510 timer and/or the T3511 timer. As described based on Table 2, the start condition of the T3510 timer may be, e.g., transmission of a registration request message. As described based on Table 2, the start condition of the T3511 timer may be a registration failure due to a lower layer failure, expiration of the T3510 timer, and/or a registration failure of causes different from the 5GMM cause values set forth in the 5.5.1.2.5 subclause of 3GPP TS 24.501 for initial registration or the subclause of TS 24.501 for mobility and periodic registration, but is not limited thereto. In one example, the electronic device 101 may start the T3410 timer and/or the T3411 timer. The start condition of the T3410 timer may be, e.g., transmission of an attach request message. The T3411 timer start condition may be at least one of attachment failure due to lower layer failure, expiration of the T3410 timer, attachment rejection of causes different from the EMM cause values set forth in the 5.5.1.2.5 subclause of 3GPP TS 24.301, tracking area updating (TAU) failure due to lower layer failure, expiration of the T3430 timer, and/or TAU rejection of causes different from the EMM cause values set forth in the 5.5.3.2.5 subclause of 3GPP TS 24.301, but is not limited. In one example, the electronic device 101 may start the T3310 timer and/or the T3311 timer. The start condition of the T3310 timer may be, e.g., transmission of an attach request message. The T3311 timer start condition may be a lower layer failure, attach rejection of values different from the cause values set forth in the chapter of 'GPRS attach' of 3GPP TS 24.008, and/or RAU rejection of values different from the cause values set forth in the chapter of 'Routing Area Update' of 3GPP TS 24.008, but is not limited thereto. In one example, the electronic device 101 may start the T3210 timer and/or the T3211 timer. The start condition of the T3210 timer may be, e.g., transmission of a location updating request message. The T3211 time start condition may be location updating reject of 3GPP TS 24.008 cause #17 network failure, RR connection after RR connection interruption during the location updating procedure, and/or lower layer failure, but is not limited thereto.

According to various embodiments, in operation 507, based on the start of the timer, the electronic device 101 may perform any one of a scan associated with the first RAT or a scan associated with the RAT according to a preset priority, based on whether the service performed in the state of being connected to the first cell is an IMS voice service. In one example, if the service performed in the state of being connected to the first cell is an IMS voice service, the electronic device 101 may perform a scan associated with the first RAT before the timer defined in the NAS layer expires. In one example, if the service performed in the state of being connected to the first cell is not an IMS voice service, before the timer defined in the NAS layer expires, the electronic device 101 may perform a scan associated with the RAT according to a preset priority. For example, for the priority between RATs, the most recently released (or deployed) RAT may have a higher priority based on the time point of release (or deployment). For example, priorities may be set in the order of NR, E-UTRA, WCDMA, and GSM, but this is merely exemplary, and the criteria for setting priorities are not limited. Depending on the scan result, the electronic device 101 may camp on to a suitable cell, and may then perform a registration procedure with the corresponding CN. After registration is performed, the electronic device 101 may perform a communication service, and registration may be performed even before the timer defined in the NAS layer expires, so that the service disconnection period may be reduced.

Meanwhile, in FIG. 5, the start of the timer defined in the NAS layer has been described as the trigger of the start of the scan in operation 507, but this is exemplary. The electronic device 101 according to various embodiments may be configured to start a scan when an event associated with a failure to register with the core network and/or a failure in the lower layer is detected.

Figure 6:
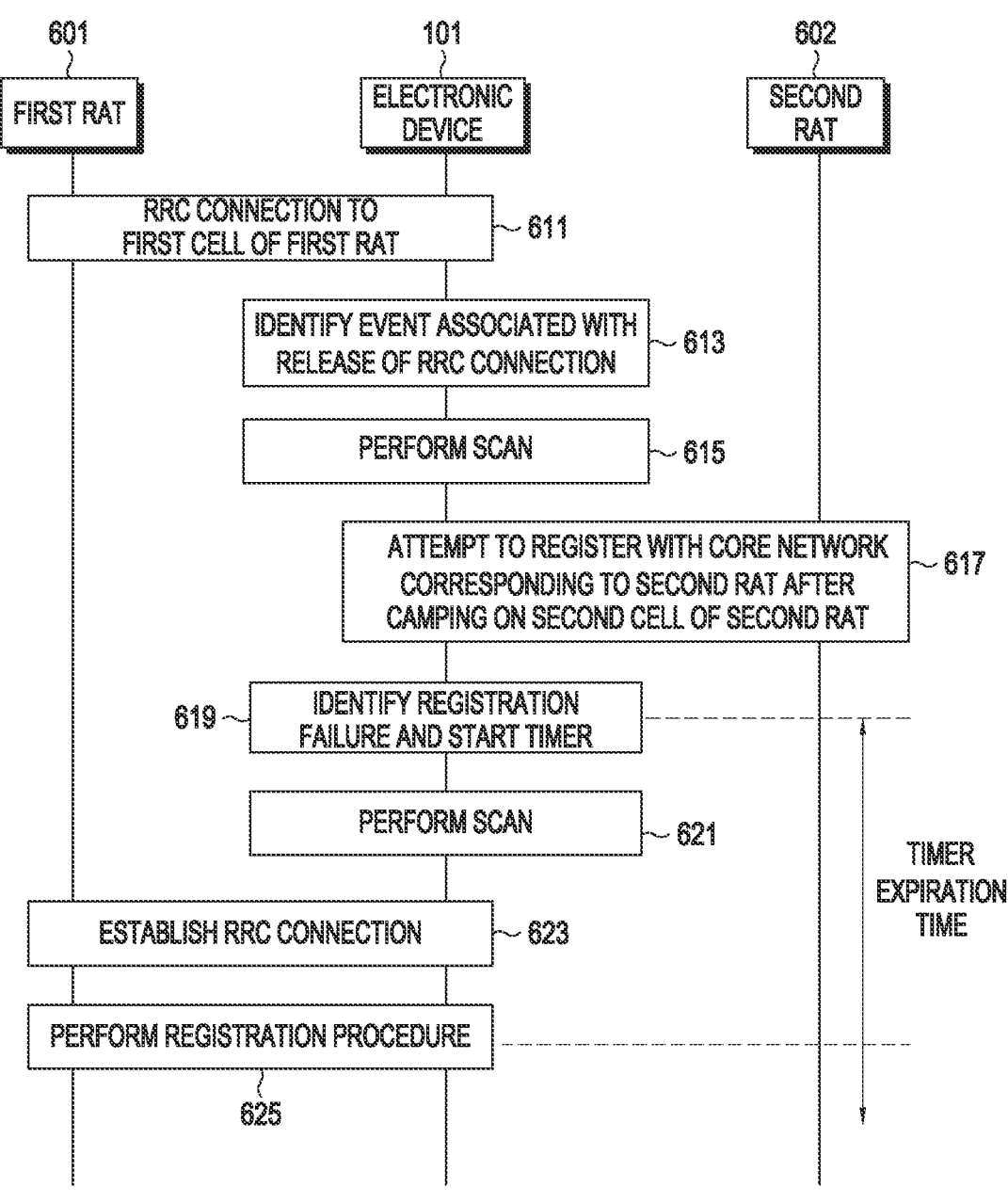
FIG. 6 is a flowchart illustrating a method for operating an electronic device according to various embodiments.

FIG. 6 is a flowchart illustrating a method for operating an electronic device according to various embodiments.

According to an embodiment, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may establish an RRC connection to the first cell of the first RAT 601 in operation 611. For example, the electronic device 101 may perform the RACH procedure after camping on the first cell of the first RAT 601, and an RRC connection may be established by performing the RACH procedure. Although not illustrated, the electronic device 101 may perform a procedure (e.g., a registration procedure or an attach procedure) for registration associated with the first cell or a procedure (e.g., a TAU procedure or an RAU procedure) for updating the location of the electronic device 101. After accessing the first cell, the electronic device 101 may perform a service based on the first RAT 601. In one example, the electronic device 101 may perform an IMS voice service based on the first RAT 601. In another example, the electronic device 101 may perform a service, e.g., data communication, other than the IMS voice service based on the first RAT 601. There is no limitation on the type of service performed based on RRC connection establishment with the first RAT 601 and registration (or location update) to the core network.

According to various embodiments, in operation 613, the electronic device 101 may identify an event associated with the release of the RRC connection. For example, the electronic device 101 may identify the RLF or the OOS, but is not limited as long as it is an event associated with releasing the RRC connection. The electronic device 101 may perform a scan in operation 615. For example, the electronic device 101 may perform a scan on the frequency identified based on pre-stored information, or may perform a scan on the frequency supported by the electronic device 101, but the method for the scan is not limited. In one example, it is assumed that the cell of the second RAT 602 is identified as a suitable cell according to the scan result for the frequency of the second RAT 602 by the electronic device 101. For example, the electronic device 101 may select the cell of the second RAT 602 based on the cell of the second RAT 602 meeting the cell selection criterion and being not barred. In operation 617, the electronic device 101 may attempt to register with the core network corresponding to the second RAT 602 after camping on the second cell of the second RAT 602. In operation 619, the electronic device 101 may identify a registration failure and may start the timer defined in the NAS layer.

According to various embodiments, the electronic device 101 may perform a scan in operation 621 based on the start of the timer. For example, in the embodiment of FIG. 6, it is assumed that the electronic device 101 scans the frequency corresponding to the first RAT 601. The electronic device 101 may scan the frequency corresponding to the first RAT 601 connected before RLF or OOS identification, based on the service performed before operation 613 being the IMS voice service. According to the frequency scan result, the electronic device 101 may select the cell of the first RAT 601. The electronic device 101 may camp on to the cell of the first RAT 601 selected according to the scan result, and may establish an RRC connection with the cell of the first RAT 601 in operation 623. In operation 625, the electronic device 101 may perform a registration procedure with the core network corresponding to the cell of the first RAT 601 based on the established RRC connection. Accordingly, the electronic device 101 may be registered with the core network corresponding to the cell of the first RAT 601. After registration, the electronic device 101 may perform a service (e.g., IMS voice service). In FIG. 3, because the cell search may not be performed before the expiration time of the timer, the service is disconnected during the expiration time of at least one timer. However, as illustrated in FIG. 6, even before the expiration time of the timer started in operation 619, the electronic device 101 may perform a service. Accordingly, even when the electric field of the RAT (e.g., the first RAT 601) other than the RAT (e.g., the second RAT 602) in which the registration failure has occurred becomes good, the service disconnection time as the timer still waits for expiration in the NAS layer may be shortened.

FIG. 7 is a flowchart illustrating a method for operating an electronic device according to various embodiments.

According to an embodiment, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may establish an RRC connection to the first cell of the first RAT in operation 701. In operation 703, the electronic device 101 may store information associated with the first cell. For example, the electronic device 101 may store the frequency corresponding to the first cell and/or identification information (e.g., PCI) about the first cell, but those skilled in the art will understand that there is no limitation as long as the information is information obtained in relation to the first cell. The electronic device 101 may be registered with the core network corresponding to the first cell based on the RRC connection and may perform a service. In operation 705, the electronic device 101 may identify the event associated with releasing the RRC connection.

According to various embodiments, the electronic device 101 may camp on to the second cell based on the scan result in operation 707. For example, the electronic device 101 may perform a scan according to identification of an event associated with releasing the RRC connection. The electronic device 101 may camp on the second cell identified as a suitable cell according to the scan result. In operation 709, the electronic device 101 may identify a registration failure. For example, the electronic device 101 may fail in the RACH procedure with the second cell, and/or may fail in at least one of the operations defined in the registration procedure after RRC connection. The timer defined in the NAS layer associated with registration may be started.

According to various embodiments, in operation 711, the electronic device 101 may determine whether the service performed in the state of being connected to the first cell is an IMS voice service. Here, the IMS voice service may refer to, e.g., various types of services through the IMS core, and may include at least one of a circuit switched (CS)-based call service as well as a packet switched (PS)-based call service such as VoLTE and VoNR. If the service performed in the state of being connected to the first cell is the IMS voice service (yes in 711), the electronic device 101 may perform a scan based on the stored information associated with the first cell in operation 713. For example, in operation 713, when the frequency associated with the first cell is stored, the electronic device 101 may perform a scan on the stored frequency. If a suitable cell is identified as a result of the scan, the electronic device 101 may camp on to the suitable cell. If a suitable cell is not discovered at the frequency associated with the first cell, the electronic device 101 may perform a scan at another frequency of the RAT corresponding to the first cell. If a suitable cell is not discovered as a result of the scan at all frequencies of the RAT corresponding to the first cell, the electronic device 101 may perform a scan in a RAT different from the RAT corresponding to the first cell.

If the service performed in the state in which the electronic device 101 is connected to the first cell is not the IMS voice service (no in 711), the electronic device 101 may perform a scan on a predesignated RAT in operation 715. For example, the electronic device 101 may perform a scan associated with the RAT according to a preset priority. For example, for the priority between RATs, the most recently released (or deployed) RAT may have a higher priority based on the time point of release (or deployment). For example, priorities may be set in the order of NR, E-UTRA, WCDMA, and GSM, but this is merely exemplary, and the criteria for setting priorities are not limited.

Figure 8:
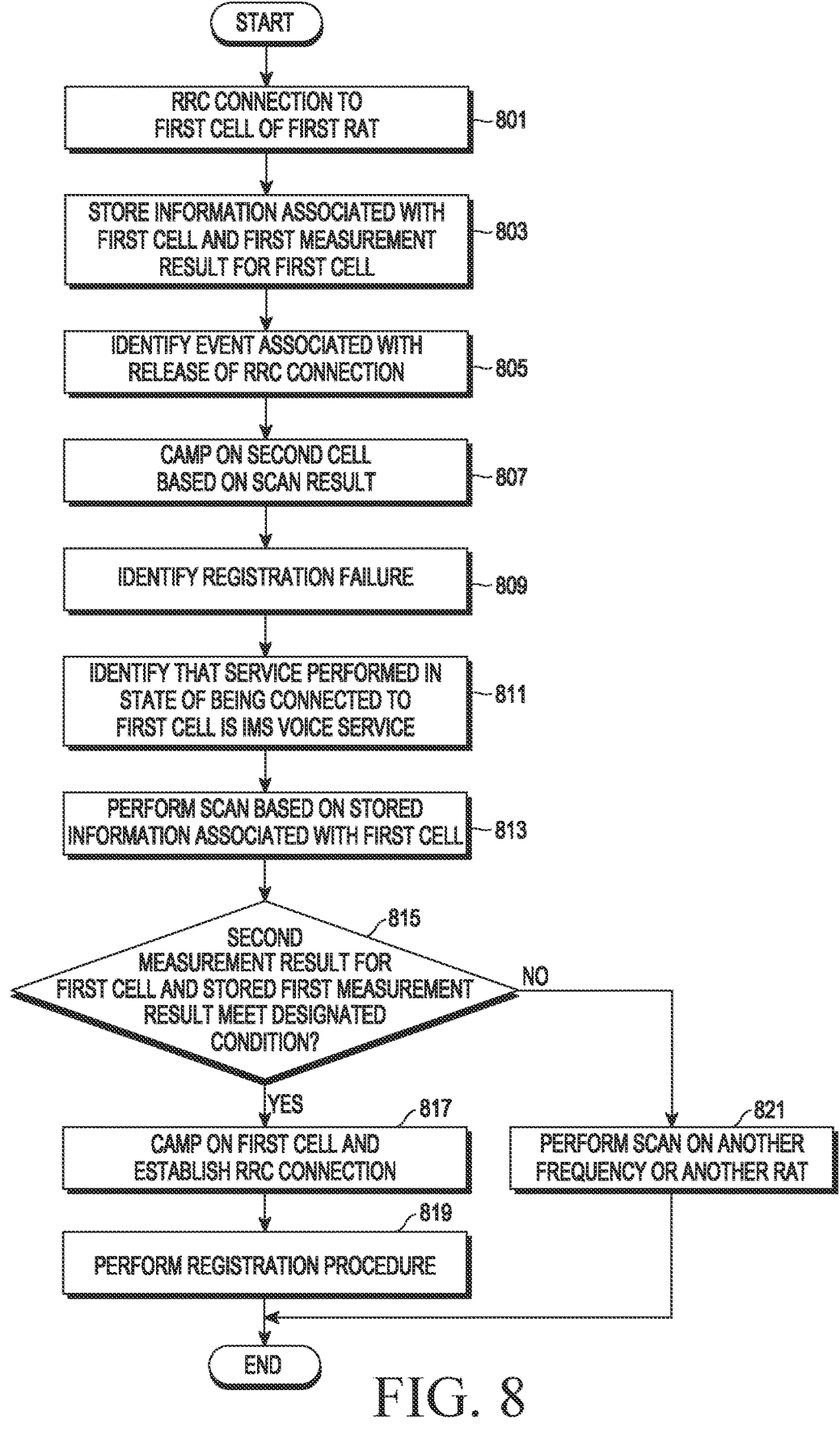
FIG. 8 is a flowchart illustrating a method for operating an electronic device according to various embodiments.

FIG. 8 is a flowchart illustrating a method for operating an electronic device according to various embodiments.

According to an embodiment, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may establish an RRC connection to the first cell of the first RAT in operation 801. In operation 803, the electronic device 101 may store information associated with the first cell and a first measurement result for the first cell. For example, the electronic device 101 may store the frequency corresponding to the first cell, identification information (e.g., PCI) about the first cell, and/or information (e.g., Srxlev and/or Squall associated with the scan of the first cell, but those skilled in the art will understand that there is no limitation as long as the information is information obtained in connection with the first cell or the scan of the first cell. The first measurement result for the first cell may be a result measured before the event associated with the release of the RRC connection in operation 805 is detected, or may be a result measured after the event associated with the release of the RRC connection is detected. For example, the electronic device 101 may periodically or aperiodically perform measurement on the serving cell, and may update the performed measurement result as the first measurement result. In this case, the result measured immediately before the event associated with the release of the RRC connection is detected may be used as the first measurement result, but is not limited thereto. The electronic device 101 may store Srxlev and/or Squal as scan-related information, or may store not only Srxlev and/or Squal, but also parameters (e.g., at least some of the parameters in Table 1) for calculating Srxlev and/or Squal. In operation 805, the electronic device 101 may identify the event associated with releasing the RRC connection.

According to various embodiments, the electronic device 101 may camp on to the second cell based on the scan result in operation 807. For example, the electronic device 101 may perform a scan according to identification of an event associated with releasing the RRC connection. The electronic device 101 may camp on to the second cell identified as a suitable cell according to the scan result. In operation 809, the electronic device 101 may identify a registration failure. For example, the electronic device 101 may fail in the RACH procedure with the second cell, and/or may fail in at least one of the operations defined in the registration procedure after RRC connection. The timer defined in the NAS layer associated with registration may be started. In operation 811, the electronic device 101 may identify that the service performed in the state of being connected to the first cell is the IMS voice service. The electronic device 101 may perform a scan based on the stored information associated with the first cell in operation 813, based on the service performed in the state of being connected to the first cell being the IMS voice service. For example, in operation 813, when the frequency associated with the first cell is stored, the electronic device 101 may perform a scan on the stored frequency. For example, the electronic device 101 may identify the second measurement result (e.g., Srxlev and/or Squal) by performing a scan on the stored frequency. The electronic device 101 may identify the second measurement result (e.g., Srxlev and/or Squal) based on the measurement intensity identified at the stored frequency and the parameter (e.g., at least some of the parameters in Table 1) identified as a result of decoding the system information block (SIB). If SIB decoding fails during the scan in operation 813 and the parameter for calculating the measurement result is stored in association with the first cell, the electronic device 101 may identify the second measurement result (e.g., Srxlev and/or Squall based on at least some of the stored parameters.

According to various embodiments, in operation 815, the electronic device 101 may determine whether the second measurement result for the first cell and the stored first measurement result meet a designated condition. In one example, when the second measurement result is a first threshold greater than the first measurement result, the electronic device 101 may determine that the designated condition is met. Alternatively, in another example, when the ratio of the second measurement result to the first measurement result is greater than a first threshold ratio, the electronic device 101 may determine that the designated condition is met. As such, the designated condition is not limited as long as it is a condition indicating that the second measurement result is better than the first measurement result. When the second measurement result and the first measurement result meet the designated condition (yes in 815), the electronic device 101 may camp on to the first cell to establish an RRC connection in operation 817. Based on the established RRC connection, the electronic device 101 may perform a registration procedure in operation 819. If the second measurement result and the first measurement result do not meet the designated condition (no in 815), the electronic device 101 may perform a scan on another frequency of the corresponding RAT or another RAT in operation 821. As described above, when the second measurement result similar to or worse than the first measurement result measured near the time point at which the event in operation 803 is detected is identified, it is highly likely that the event associated with the release of the RRC connection occurs again. The electronic device 101 may be configured to camp on to the corresponding cell when the newly measured second measurement result is significantly enhanced as compared to the first measurement result.

Figure 9:
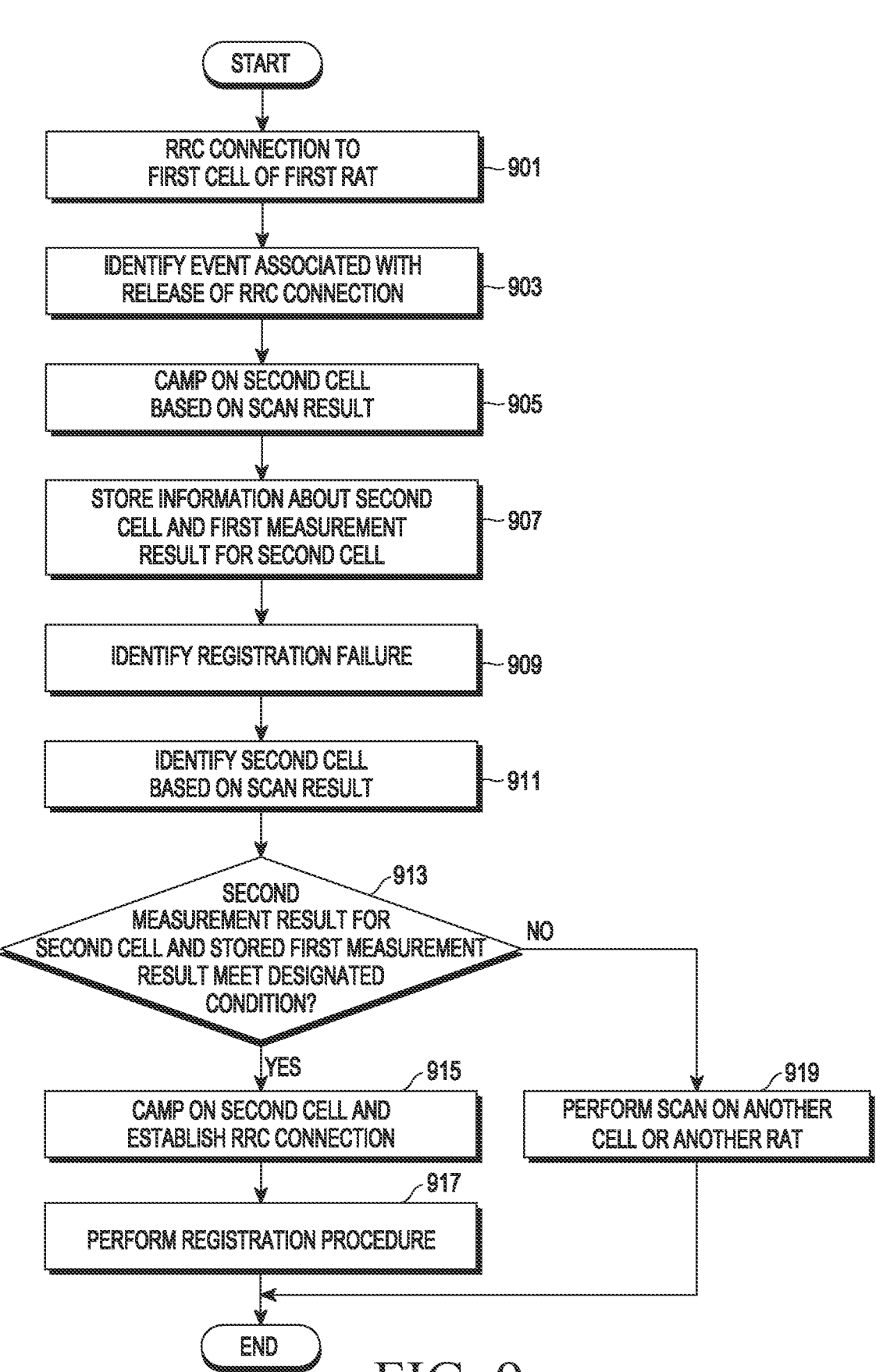
FIG. 9 is a flowchart illustrating a method of operating an electronic device according to various embodiments.

FIG. 9 is a flowchart illustrating a method of operating an electronic device according to various embodiments.

According to an embodiment, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may establish an RRC connection to the first cell of the first RAT in operation 901. In operation 903, the electronic device 101 may identify the event associated with releasing the RRC connection.

According to various embodiments, the electronic device 101 may camp on to the second cell based on the scan result in operation 905. For example, the electronic device 101 may perform a scan according to identification of an event associated with releasing the RRC connection. The electronic device 101 may camp on to the second cell identified as a suitable cell according to the scan result. In operation 907, the electronic device 101 may store information associated with the second cell and a first measurement result for the second cell. For example, the electronic device 101 may store the frequency corresponding to the second cell, identification information (e.g., PCI) about the second cell, and/or information (e.g., Srxlev and/or Squall associated with the scan of the second cell, but those skilled in the art will understand that there is no limitation as long as the information is information obtained in connection with the second cell or the scan of the second cell. The first measurement result for the second cell may be a result measured before the registration failure is identified in operation 909 (or before the timer defined in the NAS layer is started), or may be a result measured after the registration failure is identified. For example, the result measured immediately before an event corresponding to registration failure (or a trigger for initiating the timer defined in the NAS layer) is detected may be used as the first measurement result, but is not limited thereto. The electronic device 101 may store Srxlev and/or Squal as scan-related information, or may store not only Srxlev and/or Squal, but also parameters (e.g., at least some of the parameters in Table 1) for calculating Srxlev and/or Squal. In operation 909, the electronic device 101 may identify a registration failure. For example, the electronic device 101 may fail in the RACH procedure with the second cell, and/or may fail in at least one of the operations defined in the registration procedure after RRC connection. The timer defined in the NAS layer associated with registration may be started.

According to various embodiments, the electronic device 101 may identify the second cell based on the scan result in operation 911. As described above, the electronic device 101 may perform a scan based on the start of the timer defined in the NAS layer. The electronic device 101 may preferentially scan the frequency of the RAT corresponding to the first cell or preferentially scan the frequency of a predesignated RAT, depending on whether the service performed while being connected to the first cell is the IMS voice service. In some cases, the second cell may be searched again, and the embodiment of FIG. 9 assumes that the second cell is searched according to the scan according to the start of the timer defined in the NAS layer. For example, the electronic device 101 may identify the second measurement result (e.g., Srxlev and/or Squal) for the second cell by performing a scan on the stored frequency. The electronic device 101 may identify the second measurement result (e.g., Srxlev and/or Squal) based on the measurement intensity identified at the stored frequency and the parameter (e.g., at least some of the parameters in Table 1) identified as a result of decoding the system information block (SIB). If SIB decoding fails during the scan in operation 907 and the parameter for calculating the measurement result is stored in association with the first cell, the electronic device 101 may identify the second measurement result (e.g., Srxlev and/or Squal) based on at least some of the stored parameters.

According to various embodiments, in operation 913, the electronic device 101 may determine whether the second measurement result for the second cell and the stored first measurement result meet a designated condition. In one example, when the second measurement result is a first threshold greater than the first measurement result, the electronic device 101 may determine that the designated condition is met. Alternatively, in another example, when the ratio of the second measurement result to the first measurement result is greater than a first threshold ratio, the electronic device 101 may determine that the designated condition is met. As such, the designated condition is not limited as long as it is a condition indicating that the second measurement result is better than the first measurement result. When the second measurement result and the first measurement result meet the designated condition (yes in 913), the electronic device 101 may camp on to the second cell to establish an RRC connection in operation 915. Based on the established RRC connection, the electronic device 101 may perform a registration procedure in operation 917. If the second measurement result and the first measurement result do not meet the designated condition (no in 913), the electronic device 101 may perform a scan on another frequency of the corresponding RAT or another RAT in operation 919. As described above, when the second measurement result similar to or worse than the first measurement result measured near the time point at which the registration in operation 909 fails is identified, the registration failure is highly likely to occur again. The electronic device 101 may be configured to camp on to the corresponding cell when the newly measured second measurement result is significantly enhanced as compared to the first measurement result.

Figure 10B:
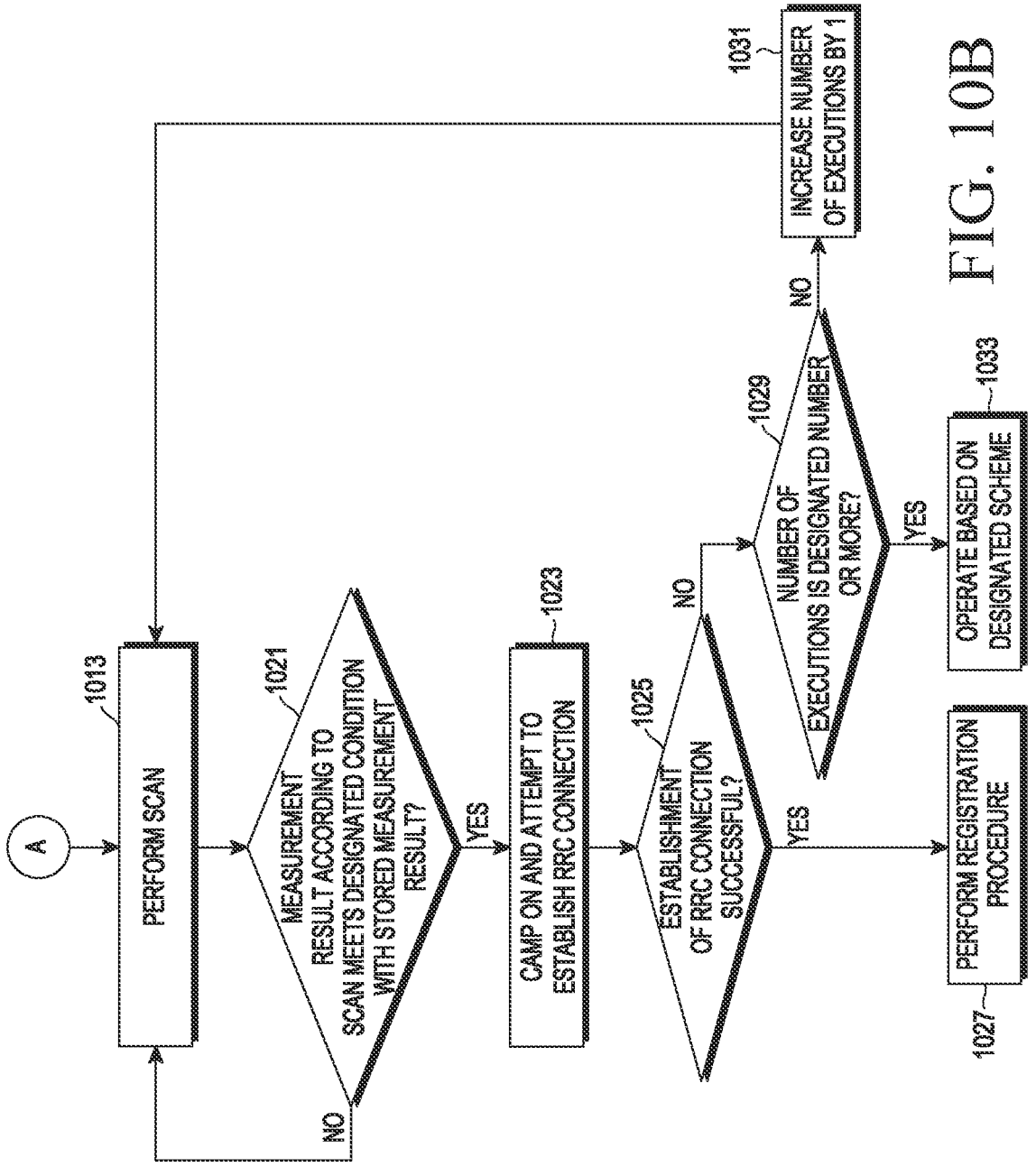

FIGS. 10A and 10B are flowcharts illustrating a method for operating an electronic device according to various embodiments.

According to an embodiment, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may establish an RRC connection to the first cell of the first RAT in operation 1001. In operation 1003, the electronic device 101 may store information associated with the first cell and a measurement result for the first cell. For example, the electronic device 101 may store the frequency corresponding to the first cell, identification information (e.g., PCI) about the first cell, and/or information (e.g., Srxlev and/or Squal) associated with the scan of the first cell, but those skilled in the art will understand that there is no limitation as long as the information is information obtained in connection with the first cell or the scan of the first cell. In operation 1005, the electronic device 101 may identify the event associated with releasing the RRC connection.

According to various embodiments, the electronic device 101 may camp on to the second cell based on the scan result in operation 1007. For example, the electronic device 101 may perform a scan according to identification of an event associated with releasing the RRC connection. The electronic device 101 may camp on to the second cell identified as a suitable cell according to the scan result. In operation 1009, the electronic device 101 may store information associated with the second cell and a measurement result for the second cell. For example, the electronic device 101 may store the frequency corresponding to the second cell, identification information (e.g., PCI) about the second cell, and/or information (e.g., Srxlev and/or Squal) associated with the scan of the second cell, but those skilled in the art will understand that there is no limitation as long as the information is information obtained in connection with the second cell or the scan of the second cell. In operation 1011, the electronic device 101 may identify a registration failure and may start the timer defined in the NAS layer based thereupon. For example, the electronic device 101 may fail in the RACH procedure with the second cell, and/or may fail in at least one of the operations defined in the registration procedure after RRC connection.

According to various embodiments, the electronic device 101 may perform a scan in operation 1013 based on the start of the timer defined in the NAS layer. As described above, when the service performed in the state of being connected to the first cell is the IMS voice service, the electronic device 101 may preferentially scan the frequency of the first RAT corresponding to the first cell. Alternatively, when the service performed in the state of being connected to the first cell is not the IMS voice service, the electronic device 101 may preferentially scan the frequency of the predetermined RAT. For example, the electronic device 101 may identify the measurement result (e.g., Srxlev and/or Squall as the scan is performed. In operation 1021, the electronic device 101 may determine whether the measurement result according to the scan meets a designated condition with the stored measurement result (e.g., the measurement result stored for the first cell or the measurement result stored for the second cell). The designated condition is not limited as long as it is a condition indicating that the newly measured result is significantly enhanced as compared with the stored measurement result. Meanwhile, when a cell is selected in an RAT other than the RAT in which registration failure has been identified or the RAT in which the initial RLF or 00S has been identified, the electronic device 101 may camp on regardless of whether the designated condition is met.

If the measurement result according to the scan does not meet the designated condition with the stored measurement result (no in 1021), the electronic device 101 may perform a scan on another frequency in the corresponding RAT or another RAT. When the measurement result according to the scan meets the designated condition with the stored measurement result (yes in 1021), the electronic device 101 may camp on to the corresponding cell to attempt to establish an RRC connection in operation 1023. In operation 1025, the electronic device 101 may determine whether RRC connection establishment is successful. If the RRC connection establishment is successful (yes in 1025), the electronic device 101 may perform a registration procedure based on the established RRC connection in operation 1027. If the registration procedure is completed, the electronic device 101 may perform a service. If establishing the RRC connection fails (no in 1025), the electronic device 101 may determine whether the number of executions is greater than or equal to a designated number of times in operation 1029. If the number of executions is less than the designated number of times (no in 1029), the electronic device 101 may increase the number of executions by 1 in operation 1031. Thereafter, the electronic device 101 may perform a scan on another frequency in the corresponding RAT or on another RAT. If the number of executions is greater than or equal to the designated number of times (yes in 1029), the electronic device 101 may operate based on a designated scheme in operation 1033. For example, while waiting for the expiration of the NAS timer, the electronic device 101 may retransmit the registration request message based on the expiration of the NAS timer, but the designated scheme is not limited thereto.

Figure 11:
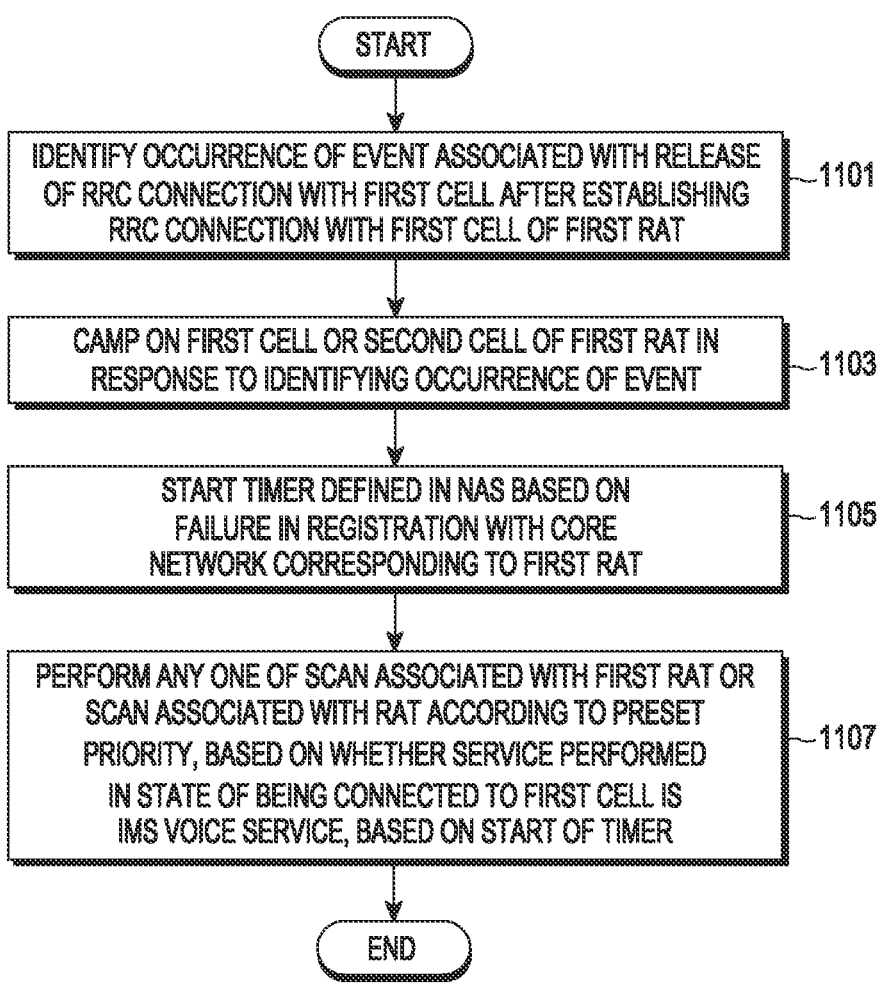
FIG. 11 is a flowchart illustrating a method for operating an electronic device according to various embodiments.

FIG. 11 is a flowchart illustrating a method for operating an electronic device according to various embodiments.

According to various embodiments, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify the occurrence of an event associated with the release of the RRC connection with the first cell after establishing the RRC connection with the first cell of the first RAT in operation 1101. For example, the electronic device 101 may identify RLF or 00S. In operation 1103, the electronic device 101 may camp on to the first cell or the second cell of the first RAT in response to identification of the occurrence of the event. In the embodiment of FIG. 5, in operation 503, the electronic device 101 camps on the second cell of the second RAT different from the first RAT. However, in the embodiment of FIG. 11, the electronic device 101 may camp on to the first cell or the second cell based on the result of performing the scan on the first RAT.

According to various embodiments, in operation 1105, the electronic device 101 may start the timer defined in the NAS layer, based on a failure to register with the core network corresponding to the first RAT. For example, the electronic device 101 may attempt to register based on the camped-on first cell or the second cell of the first RAT. However, the electronic device 101 may identify a registration failure, and may start the timer defined in the NAS based on the registration failure. For example, the timers defined in NAS may be the timers described with reference to FIG. 5, and are not limited thereto. In operation 1107, based on the start of the timer, the electronic device 101 may perform any one of a scan associated with the first RAT or a scan associated with the RAT according to a preset priority, based on whether the service performed in the state of being connected to the first cell is an IMS voice service. For example, if the service performed in the state of being connected to the first cell is an IMS voice service, the electronic device 101 may perform a scan associated with the first RAT before the timer defined in the NAS layer expires. In one example, if the service performed in the state of being connected to the first cell is not an IMS voice service, before the timer defined in the NAS layer expires, the electronic device 101 may perform a scan associated with the RAT according to a preset priority. For example, for the priority between RATs, the most recently released (or deployed) RAT may have a higher priority based on the time point of release (or deployment). For example, priorities may be set in the order of NR, E-UTRA, WCDMA, and GSM, but this is merely exemplary, and the criteria for setting priorities are not limited. Depending on the scan result, the electronic device 101 may camp on to a suitable cell, and may then perform a registration procedure with the corresponding CN. After registration is performed, the electronic device 101 may perform a communication service, and registration may be performed even before the timer defined in the NAS layer expires, so that the service disconnection period may be reduced. Meanwhile, in FIG. 11, the start of the timer defined in the NAS layer has been described as the trigger of the start of the scan in operation 1107, but this is exemplary. The electronic device 101 according to various embodiments may be configured to start a scan when an event associated with a failure to register with the core network and/or a failure in the lower layer is detected.

Meanwhile, substantially the same operations may be performed except that registration fails after camping on the second cell of the second RAT in operation 503 in the embodiment of FIG. 5 and registration fails after camping on the first cell or the second cell of the first RAT in operation 1103 in the embodiment of FIG. 11. Accordingly, it will be understood by one of ordinary skill in the art that the operation of failing in registration after camping on the cell of the second RAT in each of the embodiments of FIGS. 6, 7, 8, 9, and 10A and 10B may be replaced with the operation of failing in registration after camping on the cell of the first RAT as shown in FIG. 11.

According to various embodiments, an electronic device (e.g., the electronic device 101) may comprise at least one processor (e.g., at least one of the processor 120, the first communication processor 212, the second communication processor 214, or the integrated communication processor 260). The at least one processor may be configured to, after establishing an RRC connection with a first cell of a first RAT, identify an occurrence of an event associated with release of the RRC connection with the first cell, in response to identifying the occurrence of the event, perform a camp on to a second cell of a second RAT different from the first RAT, start a timer defined in a NAS based on a failure in registration to a core network corresponding to the second RAT, and perform, based on starting the timer, any one of a scan associated with the first RAT or a scan associated with a RAT according to a preset priority, based on whether a service performed in a state of being connected to the first cell is an IMS call service.

According to various embodiments, the at least one processor may be configured to, as at least part of performing any one of the scan associated with the first RAT or the scan associated with the RAT according to the preset priority, perform the scan associated with the first RAT based on the service performed in the state of being connected to the first cell being the IMS call service.

According to various embodiments, the at least one processor may be further configured to store information about the first cell after establishing the RRC connection with the first cell. The at least one processor may be configured to, as at least part of performing the scan associated with the first RAT based on the service performed in the state of being connected to the first cell being the IMS call service, perform a scan based on the information about the first cell.

According to various embodiments, the at least one processor may be further configured to store information about the first cell and a first measurement result for the first cell after establishing the RRC connection with the first cell. The at least one processor may be configured to, as at least part of performing the scan associated with the first RAT based on the service performed in the state of being connected to the first cell being the IMS call service, perform a scan based on information about the first cell, identify a second measurement result for the first cell based on performing the scan, and camp on to the first cell based on the first measurement result and the second measurement result meeting a designated condition.

According to various embodiments, the at least one processor may be configured to, as at least part of performing any one of the scan associated with the first RAT or the scan associated with the RAT according to the preset priority, perform the scan associated with the RAT according to the preset priority based on the service performed in the state of being connected to the first cell being not the IMS call service.

According to various embodiments, the at least one processor may be further configured to identify the second cell based on performing any one of the scan associated with the first RAT or the scan associated with the RAT according to the preset priority.

According to various embodiments, the at least one processor may be further configured to store a first measurement result for the second cell before identifying the failure in registration after camping on to the second cell. The at least one processor may be configured to, as at least part of performing any one of the scan associated with the first RAT or the scan associated with the RAT according to the preset priority, identify a second measurement result for the second cell, and camp on to the second cell based on the first measurement result and the second measurement result meeting a designated condition.

According to various embodiments, the timer defined in the NAS may include at least one of a T3510 timer, a T3511 timer, a T3410 timer, a T3411 timer, a T3310 timer, a T3311 timer, a T3211 timer, or a T3210 timer.

According to various embodiments, the at least one processor may be further configured to camp on to a cell identified by performing any one of the scan associated with the first RAT or the scan associated with the RAT according to the preset priority and attempt to establish an RRC connection to the camped-on cell.

According to various embodiments, wherein the at least one processor may be further configured to perform a registration procedure with a core network of the camped-on cell based on success in establishing the RRC connection to the camped-on cell and wait until the timer defined in the NAS expires based on a number of failures in establishing the RRC connection to the camped-on cell being a threshold number or more and re-attempt a registration procedure with a core network for the second cell according to the expiration of the timer defined in the NAS.

According to various embodiments, a method for operating an electronic device may comprise after establishing an RRC connection with a first cell of a first RAT, identifying an occurrence of an event associated with release of the RRC connection with the first cell, in response to identifying the occurrence of the event, performing a camp on to a second cell of a second RAT different from the first RAT, starting a timer defined in a NAS based on a failure in registration to a core network corresponding to the second RAT, and performing, based on starting the timer, any one of a scan associated with the first RAT or a scan associated with a RAT according to a preset priority, based on whether a service performed in a state of being connected to the first cell is an IMS call service.

According to various embodiments, performing any one of the scan associated with the first RAT or the scan associated with the RAT according to the preset priority may perform the scan associated with the first RAT based on the service performed in the state of being connected to the first cell being the IMS call service.

According to various embodiments, the method may further comprise storing information about the first cell after establishing the RRC connection with the first cell. Performing the scan associated with the first RAT based on the service performed in the state of being connected to the first cell being the IMS call service may comprise performing a scan based on the information about the first cell.

According to various embodiments, the method may further comprise storing information about the first cell and a first measurement result for the first cell after establishing the RRC connection with the first cell. Performing the scan associated with the first RAT based on the service performed in the state of being connected to the first cell being the IMS call service may include performing a scan based on information about the first cell, identifying a second measurement result for the first cell based on performing the scan, and camping on to the first cell based on the first measurement result and the second measurement result meeting a designated condition.

According to various embodiments, performing any one of the scan associated with the first RAT or the scan associated with the RAT according to the preset priority may perform the scan associated with the RAT according to the preset priority based on the service performed in the state of being connected to the first cell being not the IMS call service.

According to various embodiments, the method may further comprise identifying the second cell based on performing any one of the scan associated with the first RAT or the scan associated with the RAT according to the preset priority.

According to various embodiments, the method may further comprise storing a first measurement result for the second cell before identifying the failure in registration after camping on to the second cell. Performing any one of the scan associated with the first RAT or the scan associated with the RAT according to the preset priority may include identifying a second measurement result for the second cell, and camping on to the second cell based on the first measurement result and the second measurement result meeting a designated condition.

According to various embodiments, the method may further comprise camping on to a cell identified by performing any one of the scan associated with the first RAT or the scan associated with the RAT according to the preset priority and attempting to establish an RRC connection to the camped-on cell.

According to various embodiments, the method may further comprise performing a registration procedure with a core network of the camped-on cell based on success in establishing the RRC connection to the camped-on cell and wait until the timer defined in the NAS expires based on a number of failures in establishing the RRC connection to the camped-on cell being a threshold number or more and re-attempting a registration procedure with a core network for the second cell according to the expiration of the timer defined in the NAS.

According to various embodiments, an electronic device may comprise at least one processor. The at least one processor may be configured to, after establishing an RRC connection with a first cell of a first RAT, identify an occurrence of an event associated with release of the RRC connection with the first cell, in response to identifying the occurrence of the event, perform a camp on to the first cell of the first RAT or a second cell of the first RAT, start a timer defined in a NAS based on a failure in registration to a core network corresponding to the first RAT, and perform, based on starting of the timer, any one of a scan associated with the first RAT or a scan associated with a RAT according to a preset priority, based on whether a service performed in a state of being connected to the first cell is an IMS call service.

According to various embodiments, a computer program product including a storage medium storing instructions can be configured to be executed by at least one processor of an electronic device to perform a plurality of operations. The operations can include after establishing an RRC connection with a first cell of a first RAT, identifying an occurrence of an event associated with release of the RRC connection with the first cell, in response to identifying the occurrence of the event, performing a camp on to a second cell of a second RAT different from the first RAT, starting a timer defined in a NAS based on a failure in registration to a core network corresponding to the second RAT, and performing, based on starting the timer, any one of a scan associated with the first RAT or a scan associated with a RAT according to a preset priority, based on whether a service performed in a state of being connected to the first cell is an IMS call service.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising at least one processor, wherein the at least one processor is configured to:
   after establishing a radio resource control (RRC) connection with a first cell of a first radio access technology (RAT) of a plurality of RATs, identify an occurrence of an event associated with release of the RRC connection with the first cell;

in response to identifying the occurrence of the event, perform a camp on to a second cell of a second RAT of the plurality of RATs, the second RAT different from the first RAT;

start a timer defined in a non-access stratum (NAS) based on a failure in registration to a core network corresponding to the second RAT; and based on starting the timer:
   perform a first scan associated with the first RAT based on a service performed in a state of being connected to the first cell being an international mobile subscriber (IMS) call service; and
   perform a second scan associated with a RAT of the plurality of RATs according to a preset priority based on the service performed in the state of being connected to the first cell being not the IMS call service.

2. The electronic device of claim 1, wherein the at least one processor is further configured to store information about the first cell after establishing the RRC connection with the first cell, and
   wherein the at least one processor is configured to, as at least part of performing the first scan associated with the first RAT, perform a scan based on the information about the first cell, based on the service performed in the state of being connected to the first cell being the IMS call service.

3. The electronic device of claim 1, wherein the at least one processor is further configured to store information about the first cell and a first measurement result for the first cell after establishing the RRC connection with the first cell, and wherein the at least one processor is configured to, as at least part of performing the first scan associated with the first RAT based on the service performed in the state of being connected to the first cell being the IMS call service,
   perform a scan based on information about the first cell;
   identify a second measurement result for the first cell based on performing the scan; and
   camp on to the first cell based on the first measurement result and the second measurement result meeting a designated condition.

4. The electronic device of claim 1, wherein the at least one processor is further configured to identify the second cell based on performing any one of the first scan associated with the first RAT or the second scan associated with the RAT according to the preset priority.

5. The electronic device of claim 4, wherein the at least one processor is further configured to store a first measurement result for the second cell before identifying the failure in registration after camping on to the second cell, and wherein the at least one processor is configured to, as at least part of performing any one of the first scan associated with the first RAT or the second scan associated with the RAT according to the preset priority,
   identify a second measurement result for the second cell; and
   camp on to the second cell based on the first measurement result and the second measurement result meeting a designated condition.

6. The electronic device of claim 1, wherein the timer defined in the NAS includes at least one of a T3510 timer, a T3511 timer, a T3410 timer, a T3411 timer, a T3310 timer, a T3311 timer, a T3211 timer, or a T3210 timer.

7. The electronic device of claim 1, wherein the at least one processor is further configured to:

camp on to a cell identified by performing any one of the first scan associated with the first RAT or the second scan associated with the RAT according to the preset priority; and attempt to establish an RRC connection to the camped-on cell.

8. The electronic device of claim 7, wherein the at least one processor is further configured to:

perform a registration procedure with a core network of the camped-on cell based on success in establishing the RRC connection to the camped-on cell; and wait until the timer defined in the NAS expires based on a number of failures in establishing the RRC connection to the camped-on cell being a threshold number or more, and re-attempt a registration procedure with a core network for the second cell according to the expiration of the timer defined in the NAS.

9. A method for operating an electronic device, the method comprising:

after establishing a radio resource control (RRC) connection with a first cell of a first radio access technology (RAT) of a plurality of RATs, identifying an occurrence of an event associated with release of the RRC connection with the first cell;

in response to identifying the occurrence of the event, performing a camp on to a second cell of a second RAT of the plurality of RATs, the second RAT different from the first RAT;

starting a timer defined in a non-access stratum (NAS) based on a failure in registration to a core network corresponding to the second RAT; and based on starting the timer:

performing a first scan associated with the first RAT based on a service performed in a state of being connected to the first cell being an international mobile subscriber (IMS) call service; and performing a second scan associated with a RAT of the plurality of RATs according to a preset priority based on the service performed in the state of being connected to the first cell being not the IMS call service.

10. The method of claim 9, further comprising storing information about the first cell after establishing the RRC connection with the first cell, and wherein performing the first scan associated with the first RAT based on the service performed in the state of being connected to the first cell being the IMS call service comprises performing a scan based on the information about the first cell.

11. The method of claim 9, further comprising:

storing information about the first cell and a first measurement result for the first cell after establishing the RRC connection with the first cell, and wherein performing the first scan associated with the first RAT based on the service performed in the state of being connected to the first cell being the IMS call service includes:

performing a scan based on information about the first cell;

identifying a second measurement result for the first cell based on performing the scan; and camping on to the first cell based on the first measurement result and the second measurement result meeting a designated condition.

12. The method of claim 9, further comprising:

identifying the second cell based on performing any one of the first scan associated with the first RAT or the second scan associated with the RAT according to the preset priority.

13. The method of claim 12, further comprising:

storing a first measurement result for the second cell before identifying the failure in registration after camping on to the second cell, and wherein as at least part of performing any one of the first scan associated with the first RAT or the second scan associated with the RAT according to the preset priority;

identifying a second measurement result for the second cell; and camping on to the second cell based on the first measurement result and the second measurement result meeting a designated condition.

14. The method of claim 9, further comprising:

camping on to a cell identified by performing any one of the first scan associated with the first RAT or the second scan associated with the RAT according to the preset priority; and attempting to establish an RRC connection to the camped-on cell.

15. The method of claim 9, further comprising:

performing a registration procedure with a core network of the camped-on cell based on success in establishing the RRC connection to the camped-on cell; and waiting until the timer defined in the NAS expires based on a number of failures in establishing the RRC connection to the camped-on cell being a threshold number or more, and re-attempting a registration procedure with a core network for the second cell according to the expiration of the timer defined in the NAS.

16. A computer program product comprising a non-transitory storage medium storing instructions configured to be executed by at least one processor of an electronic device to perform a plurality of operations comprising:

after establishing a radio resource control (RRC) connection with a first cell of a first radio access technology (RAT) of a plurality of RATs, identifying an occurrence of an event associated with release of the RRC connection with the first cell;

in response to identifying the occurrence of the event, performing a camp on to a second cell of a second RAT of the plurality of RATs, the second RAT different from the first RAT;

starting a timer defined in a non-access stratum (NAS) based on a failure in registration to a core network corresponding to the second RAT; and based on starting the timer:

performing a first scan associated with the first RAT based on a service performed in a state of being connected to the first cell being an international mobile subscriber (IMS) call service; and performing a second scan associated with a RAT of the plurality of RATs according to a preset priority based on the service performed in the state of being connected to the first cell being not the IMS call service.

* * * * *